United States Patent
Mulligan et al.

(10) Patent No.: US 10,153,943 B2
(45) Date of Patent: Dec. 11, 2018

(54) METHODS AND APPARATUS TO PROVISION CLOUD COMPUTING NETWORK ELEMENTS

(71) Applicant: AT&T Intellectual Property I, L.P., Atlanta, GA (US)

(72) Inventors: John T. Mulligan, Brick, NJ (US); David John Knight, Summerville, SC (US); Ronnie R. Kulper, Morganville, NJ (US); Don J. Moloney, Oceanport, NJ (US); Mai-Uyen Thi Nguyen, Farmingdale, NJ (US); Han Q. Nguyen, Marlboro, NJ (US); Diana Lynn Toll-Verry, Robbinsville, NJ (US); Simon S. Zelingher, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 58 days.

(21) Appl. No.: 14/953,839

(22) Filed: Nov. 30, 2015

(65) Prior Publication Data
US 2016/0087835 A1  Mar. 24, 2016

Related U.S. Application Data

(63) Continuation of application No. 14/251,725, filed on Apr. 14, 2014, now Pat. No. 9,203,775, which is a
(Continued)

(51) Int. Cl.
*H04L 12/24* (2006.01)
*H04L 12/751* (2013.01)
(Continued)

(52) U.S. Cl.
CPC ...... *H04L 41/0803* (2013.01); *G06F 9/45533* (2013.01); *H04L 41/5048* (2013.01);
(Continued)

(58) Field of Classification Search
CPC . H04L 41/5048; H04L 41/5096; H04L 47/70; H04L 49/70; G06F 9/45533
See application file for complete search history.

(56) References Cited

U.S. PATENT DOCUMENTS

| | | |
|---|---|---|
| 5,778,071 A * | 7/1998 | Caputo .................. G06F 21/34 375/220 |
| 5,790,548 A | 8/1998 | Sistanizadeh et al. |

(Continued)

OTHER PUBLICATIONS

U.S. Office Action dated Apr. 11, 2013 in U.S. Appl. No. 12/963,363.
(Continued)

*Primary Examiner* — Dung B Huynh
(74) *Attorney, Agent, or Firm* — Hartman & Citrin LLC

(57) ABSTRACT

Methods and apparatus to provision cloud computing network elements are disclosed. A disclosed example method includes receiving a selection of a cloud networking template from a client, wherein the cloud networking template includes a data center connector type and a wide area network connector type, configuring a virtual machine on a host server based on the cloud networking template, configuring a data center connector based on the data center connector type, configuring a wide area network connector based on the wide area network connector type, and coupling the wide area network connector to the data center connector and coupling the data center connector to the virtual machine within the host server to enable the client to access the virtual machine.

27 Claims, 13 Drawing Sheets

Related U.S. Application Data continuation of application No. 12/963,363, filed on Dec. 8, 2010, now Pat. No. 8,699,499.

(51) Int. Cl.
*H04L 12/931* (2013.01)
*G06F 9/455* (2018.01)
*H04L 12/911* (2013.01)

(52) U.S. Cl.
CPC ........ *H04L 41/5096* (2013.01); *H04L 45/02* (2013.01); *H04L 47/70* (2013.01); *H04L 49/70* (2013.01)

(56) References Cited

U.S. PATENT DOCUMENTS

| | | | |
|---|---|---|---|
| 5,862,324 A * | 1/1999 | Collins | H04L 12/14 709/220 |
| 5,943,338 A * | 8/1999 | Duclos | H04Q 11/0478 370/395.65 |
| 6,055,575 A * | 4/2000 | Paulsen | H04L 29/06 709/226 |
| 6,088,443 A | 7/2000 | Darland et al. | |
| 6,553,489 B1 | 4/2003 | Osler et al. | |
| 6,667,971 B1 | 12/2003 | Modarressi et al. | |
| 7,130,393 B2 | 10/2006 | Hall, Jr. et al. | |
| 7,363,363 B2 | 4/2008 | Dal Canto et al. | |
| 7,447,151 B2 | 11/2008 | McDysan | |
| 7,516,198 B1 | 4/2009 | Appala et al. | |
| 7,706,401 B2 | 4/2010 | Bae et al. | |
| 7,920,549 B2 | 4/2011 | Alt et al. | |
| 7,983,254 B2 | 7/2011 | Alt et al. | |
| 8,046,441 B2 * | 10/2011 | Banerji | G06Q 30/06 709/220 |
| 8,184,641 B2 | 5/2012 | Alt et al. | |
| 8,201,237 B1 * | 6/2012 | Doane | H04L 67/34 713/153 |
| 8,325,706 B2 | 12/2012 | Pacella | |
| 8,331,362 B2 | 12/2012 | Shukla et al. | |
| 8,356,087 B1 | 1/2013 | Miller et al. | |
| 8,369,333 B2 | 2/2013 | Hao et al. | |
| 8,417,938 B1 | 4/2013 | Considine et al. | |
| 8,429,651 B2 | 4/2013 | Donnellan et al. | |
| 8,484,355 B1 | 7/2013 | Lochhead et al. | |
| 8,537,854 B2 | 9/2013 | Bae et al. | |
| 8,571,011 B2 | 10/2013 | Alt et al. | |
| 8,578,076 B2 | 11/2013 | Van Der Linden et al. | |
| 8,601,091 B2 | 12/2013 | Venouss | |
| 8,695,059 B2 | 4/2014 | Kopti | |
| 8,699,499 B2 * | 4/2014 | Mulligan | G06F 9/45533 370/395.51 |
| 8,713,628 B2 | 4/2014 | Kopti | |
| 8,756,602 B2 | 6/2014 | Narayanasamy et al. | |
| 8,806,606 B2 | 8/2014 | Ahmad et al. | |
| 9,203,775 B2 * | 12/2015 | Mulligan | G06F 9/45533 |
| 2001/0047406 A1 * | 11/2001 | Araujo | H04L 29/06 709/223 |
| 2002/0010765 A1 * | 1/2002 | Border | H04B 7/18582 709/220 |
| 2002/0052965 A1 * | 5/2002 | Dowling | H04W 12/02 709/230 |
| 2003/0069972 A1 * | 4/2003 | Yoshimura | H04L 12/4645 709/226 |
| 2003/0149778 A1 * | 8/2003 | Robinson | H04L 63/0428 709/229 |
| 2004/0088390 A1 * | 5/2004 | Hall | G06F 17/30174 709/221 |
| 2004/0184420 A1 * | 9/2004 | Xu | H04L 45/58 370/328 |
| 2004/0192277 A1 | 9/2004 | Pakarinen et al. | |
| 2004/0261116 A1 * | 12/2004 | Mckeown | H04L 12/2801 725/109 |
| 2005/0240990 A1 * | 10/2005 | Trutner | H04L 63/0227 726/11 |
| 2006/0046712 A1 | 3/2006 | Shamp et al. | |
| 2006/0090136 A1 | 4/2006 | Miller et al. | |
| 2006/0101262 A1 * | 5/2006 | Haney | H04L 12/4633 713/153 |
| 2006/0146997 A1 * | 7/2006 | Qian | H04M 3/42059 379/88.16 |
| 2006/0184937 A1 | 8/2006 | Abels et al. | |
| 2006/0221919 A1 * | 10/2006 | McRae | H04W 48/16 370/338 |
| 2006/0236093 A1 * | 10/2006 | Brok | H04L 63/0209 713/151 |
| 2006/0248335 A1 | 11/2006 | Frazier et al. | |
| 2007/0043860 A1 * | 2/2007 | Pabari | G06F 9/5072 709/224 |
| 2007/0079307 A1 | 4/2007 | Dhawan et al. | |
| 2007/0192329 A1 | 8/2007 | Croft et al. | |
| 2007/0198656 A1 | 8/2007 | Mazzaferri et al. | |
| 2007/0211677 A1 * | 9/2007 | Laroia | H04W 40/244 370/338 |
| 2007/0239858 A1 | 10/2007 | Banerji et al. | |
| 2007/0248085 A1 | 10/2007 | Volpano | |
| 2007/0300220 A1 * | 12/2007 | Seliger | G06F 8/61 718/1 |
| 2008/0062891 A1 | 3/2008 | Van der Merwe et al. | |
| 2008/0091807 A1 * | 4/2008 | Strub | H04L 41/0893 709/223 |
| 2008/0205445 A1 * | 8/2008 | Kumar | H04L 69/163 370/469 |
| 2009/0193513 A1 * | 7/2009 | Agarwal | H04L 63/0227 726/15 |
| 2009/0285190 A1 * | 11/2009 | Baron | H04L 12/2867 370/338 |
| 2010/0027552 A1 * | 2/2010 | Hill | H04L 12/66 370/401 |
| 2010/0226368 A1 | 9/2010 | Mack-Crane et al. | |
| 2010/0299313 A1 * | 11/2010 | Orsini | H04L 9/085 707/652 |
| 2010/0309927 A1 * | 12/2010 | Aubin | H04L 12/4675 370/409 |
| 2010/0322255 A1 | 12/2010 | Hao et al. | |
| 2010/0325422 A1 * | 12/2010 | Gnanasambandam | G06F 17/30082 713/153 |
| 2011/0019654 A1 | 1/2011 | Harmatos et al. | |
| 2011/0022694 A1 | 1/2011 | Dalal et al. | |
| 2011/0075667 A1 | 3/2011 | Li et al. | |
| 2011/0113205 A1 * | 5/2011 | Garcia Puga | H04L 67/1095 711/160 |
| 2011/0142053 A1 * | 6/2011 | Van Der Merwe | H04L 47/72 370/395.1 |
| 2011/0202623 A1 * | 8/2011 | Williams | H04L 69/162 709/207 |
| 2011/0208958 A1 * | 8/2011 | Stuedi | G06F 17/30017 713/150 |
| 2011/0231899 A1 * | 9/2011 | Pulier | G06F 9/45558 726/1 |
| 2011/0246992 A1 * | 10/2011 | Kern | G06F 9/5072 718/100 |
| 2011/0261828 A1 | 10/2011 | Smith | |
| 2011/0277001 A1 * | 11/2011 | Kaluskar | H04L 12/2818 725/80 |
| 2011/0289134 A1 * | 11/2011 | de los Reyes | H04L 63/20 709/203 |
| 2011/0292942 A1 | 12/2011 | Imai | |
| 2011/0317703 A1 | 12/2011 | Dunbar et al. | |
| 2012/0020341 A1 * | 1/2012 | Moeller | H04W 88/16 370/338 |
| 2012/0054626 A1 * | 3/2012 | Odenheimer | G06F 9/5072 715/738 |
| 2012/0060153 A1 | 3/2012 | Bealkowski | |
| 2012/0151057 A1 * | 6/2012 | Paredes | H04L 12/4641 709/225 |
| 2012/0158923 A1 | 6/2012 | Mohamed et al. | |
| 2012/0185913 A1 * | 7/2012 | Martinez | G06F 9/455 726/1 |
| 2013/0054426 A1 | 2/2013 | Rowland et al. | |
| 2013/0227672 A1 | 8/2013 | Ogg et al. | |

(56) References Cited

U.S. PATENT DOCUMENTS

| | | |
|---|---|---|
| 2013/0276090 A1 | 10/2013 | Kopti |
| 2014/0181966 A1 | 6/2014 | Carney et al. |
| 2014/0250240 A1 | 9/2014 | Schell et al. |
| 2014/0297872 A1 | 10/2014 | Narayanasamy et al. |

OTHER PUBLICATIONS

U.S. Notice of Allowance dated Oct. 23, 2013 in U.S. Appl. No. 12/963,363.
U.S. Notice of Allowance dated Oct. 16, 2014 in U.S. Appl. No. 14/251,725.
U.S. Notice of Allowance dated Feb. 27, 2015 in U.S. Appl. No. 14/251,725.

\* cited by examiner ered as virtualization of a computer network. Cloud computing platforms utilize virtualization of network and/or computing resources. Accordingly, new resources provisioned for a client may be quickly added as needed within short periods of time by a service provider allocating an additional portion of shared resources to the client. Additionally, virtualization in cloud computing enables service providers to dynamically multiplex resources among multiple clients without dedicating individual physical resources to each client.
METHODS AND APPARATUS TO PROVISION CLOUD COMPUTING NETWORK ELEMENTS

CROSS-REFERENCE TO RELATED APPLICATIONS

This application is a continuation of U.S. patent application Ser. No. 14/251,725, filed Apr. 14, 2014, now allowed U.S. Pat. No. 9,203,775 which is a continuation of U.S. patent application Ser. No. 12/963,363, filed Dec. 8, 2010, now U.S. Pat. No. 8,699,499, the entire contents of which are incorporated by reference herein.

FIELD OF THE DISCLOSURE

This disclosure relates generally to cloud computing and, more particularly, to methods and apparatus to provision cloud computing network elements.

BACKGROUND

Cloud computing platforms are becoming popular with clients and customers by providing flexible, on demand resources at a relatively low cost. A cloud computing network, also known as a distributive computing network, enables clients to manage web-based applications and/or data resources by dynamically leasing computational resources and associated network resources from service providers. These web-based applications and/or data resources may be used by customers of the clients, individuals associated with the clients, and/or by the clients. This dynamic leasing of computational and network resources creates an appearance and function of a distributive computing network and, thus, can be referred to as virtualization of a computer network. Cloud computing platforms utilize virtualization of network and/or computing resources. Accordingly, new resources provisioned for a client may be quickly added as needed within short periods of time by a service provider allocating an additional portion of shared resources to the client. Additionally, virtualization in cloud computing enables service providers to dynamically multiplex resources among multiple clients without dedicating individual physical resources to each client.

DETAILED DESCRIPTION

Figure 1:
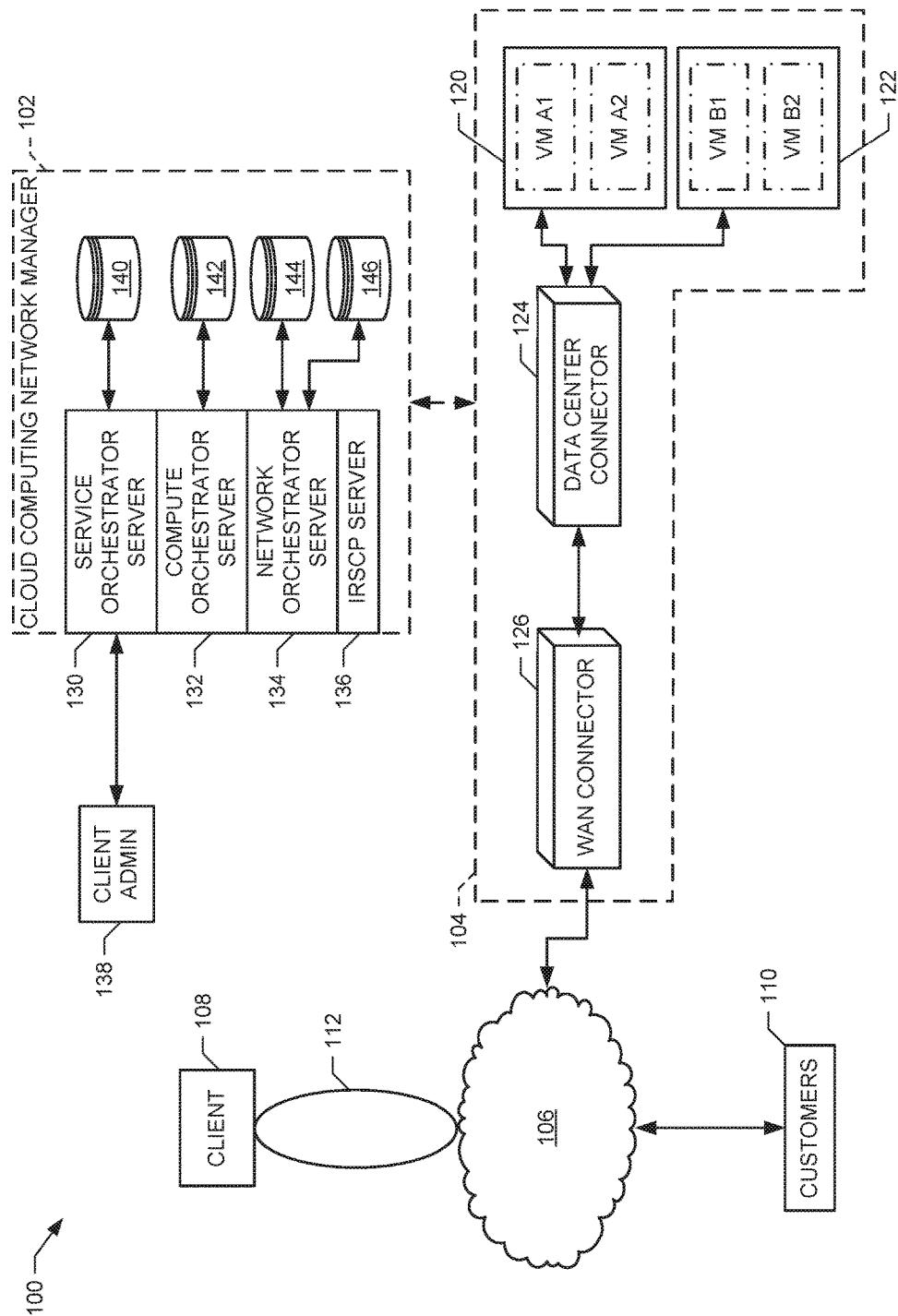
FIG. 1 is a schematic illustration of an example communication system including a cloud computing network and a cloud computing network manager.

Example methods, articles of manufacture, and apparatus to provision cloud computing network elements are disclosed. A disclosed example method includes receiving a selection of a cloud networking template from a client, wherein the cloud networking template includes a data center connector type and a WAN connector type. The example method also includes configuring a virtual machine on a host server based on the cloud networking template, configuring a data center connector based on the data center connector type, and configuring a WAN connector based on the WAN connector type. The example method further includes coupling the WAN connector to the data center connector and coupling the data center connector to the virtual machine within the host server to enable the client to access the virtual machine.

A disclosed example apparatus includes a first server to receive a selection from a client of a cloud networking template, wherein the cloud networking template includes a data center connector type and a WAN connector type. The example apparatus also includes a second server to configure a virtual machine on a host server based on information received from the client. The example apparatus further includes a third server to configure a data center connector based on the data center connector type and configure a WAN connector based on the WAN connector type. The example third server is also to couple the WAN connector to the data center connector and couple the data center connector to the virtual machine within the host server to enable the client to access the virtual machine.

Cloud computing networks enable subscribing clients to flexibly lease virtual servers (e.g., virtual machines) based on customer usage and/or individual client usage. The cloud computing networks are typically used for software-as-a-service (SaaS) web-based front-end applications (e.g., online retail businesses) and/or infrastructure-as-a-service (IaaS) data processing applications. Cloud computing networks may also be used for computing-as-a-service (CaaS) applications and storage-as-a-service database management applications. The cloud computing networks are managed by service providers (e.g., network managers) who may allocate resources among the cloud computing networks based on usage, demand, and/or other factors that influence utilization of these resources. The resources may be allocated as virtual machines and associated network resources that are used to provide access to computing resources of one or more servers (e.g., hosts).

To request a virtual machine from a service provider, a client typically provides the service provider with a list of services (e.g., applications) to be operated by the virtual machine, physical location(s) of the client, Internet Protocol (IP) addresses (e.g., IP address subnet prefixes) associated with the client, and/or a type of routing network that is used to provide connectivity between the client and the virtual machine. A service provider uses the information from the client to select appropriate interfaces to enable the client to communicatively couple to a virtual machine through a cloud computing network. In many instances, a request from a client for a virtual machine and/or other cloud computing resources requires a service provider to make changes to cloud computing resources and/or network elements of a cloud computing network within a few minutes.

Cloud computing resources include infrastructure elements that provide services accessible by a client and/or customers of a client. In many known cloud computing networks, cloud computing resources include virtual kernels (vkernel) that bridge applications operated by virtual machines to underlying host hardware components (e.g., a server). The cloud computing resources may include, for example, virtual machines, load balancers and/or firewalls. The cloud computing resources are communicatively coupled to a client within a cloud computing network via network elements. In cloud computing networks, the network elements may include, for example, infrastructure provider edge (iPE) IP/Multiprotocol Label Switching (MPLS) routers, Intelligent Routing Service Control Points (IRSCPs), Virtual Switches (VSwitches), Access Multiplexers, and/or MPLS Virtual Private Network (VPN) control planes. An iPE router may provide Layer-2 and/or Layer-3 network connectivity access to cloud computing virtual machines and/or virtual appliances. An Access Multiplexer may multiplex traffic from servers within a server cluster to a network and/or de-multiplex traffic from the network to a server within the cluster.

Many known service providers utilize certain types and/or combinations of network elements to reduce network operational complexity within a cloud computing network. For example, a typical service provider may communicatively couple client VPNs to virtual machines via Layer-3 static routes in a cloud computing network. However, some clients may request unanticipated combinations of network elements and/or cloud computing resources (e.g., coupling a client network to a virtual machine using a Layer-2 Virtual LAN (VLAN) and a Virtual Private Local Area Network (LAN) Service (VPLS)). To facilitate these unanticipated requests, some known service providers may spend days and/or weeks to implement a unique combination of network elements. To implement a client request, for example, a service provider may have to provision iPE routers, VSwitches, and/or Access Multiplexers of a cloud computing network to communicatively couple the client to a virtual machine. In other examples, service providers may decline the client request because the service providers want to avoid creating specialized connections within the cloud computing network.

To implement unanticipated requests, many known service providers may have to increase the complexity of a cloud computing network by having to support different types and/or combinations of network elements. However, such a complex network runs the risk of a situation in which an issue experienced by one network element may propagate unexpectedly to other network elements. In a relatively large scale cloud computing network that supports relatively large numbers of clients, an issue may affect many clients for a relatively long period of time. However, many of these clients may have no tolerance for down-time.

The example methods, apparatus, and articles of manufacture described herein enable service providers to instantiate cloud computing network resources and/or network elements on-demand from a client. In other words, the methods, apparatus, and articles of manufacture described herein enable a service provider to create and couple (e.g., directly, communicatively, indirectly, etc.) a virtual machine to a client within minutes of a client requesting the virtual machine regardless of a uniqueness of the client request. To provide this on-demand service to clients, the example methods, apparatus, and articles of manufacture described herein utilize a network orchestrator server that implements connectivity access configuration changes to a routing infrastructure of a cloud computing network while also managing corresponding changes to an IP control plane of the cloud computing network.

The coordinated control provided by the example network orchestrator server enables a service provider to flexibly and/or dynamically communicatively couple cloud computing resources to an IP network (e.g., a private network) of the client via a combination of network elements, thereby enabling client-specific reachability requirements (e.g., Internet-based connections, Layer-3 MPLS-VPN based connections, etc.). In this manner, a service provider may efficiently host virtual machines for clients regardless of a type of network used by the client.

The example network orchestrator server described herein provides on-demand service by coupling together modular sets of network elements and associated logical configurations based on combinatorial usage logic translated from a client's selection of abstract capabilities described by cloud networking templates. For example, a service provider creates cloud networking templates that a client may select to specify a combination of network capabilities that the client wants to use to provide reachability between the client and the associated virtual machines. The cloud networking templates may include different types and/or combinations of network capabilities. For example, cloud networking templates may include one or more WAN connector types and/or one or more data center connector types. A client selects a cloud networking template that has a WAN connector type that is compatible with the network of the client and has a data center connector type that is compatible with a network connectivity for virtual machines and/or appliances desired by the client. Based on the selected cloud networking template, the example network orchestrator server described herein selects and configures relevant network elements and/or cloud computing resources that correspond to the selected WAN connector type and/or the data center connector type.

The cloud networking templates may also include multiple WAN connectors and/or data center connectors. By providing multiple types of connectors within a template, a client can select a connection to couple a network of the client to a virtual machine and can select a connection to enable customers of the client to access the virtual machine. In this manner, the example network orchestrator server described herein enables a client to provision different types of network elements for a single virtual machine based on different types of networks of potential users, thereby eliminating the use of additional virtual machines for each network type.

The example methods, apparatus, and articles of manufacture described herein enable a service provider to create different types of cloud networking templates based on possible combinations of network capabilities. By enabling clients to select a cloud networking template, the example methods, apparatus, and articles of manufacture described herein provision network elements and/or cloud computing resources on-demand from a client regardless of the unusual and/or uncommon combination of network elements and/or cloud computing resources. This on-demand service enables a service provider to relatively rapidly respond to client requirements and/or requests. Further, the on-demand service enables a service provider to provide a level of flexibility to serve a demand for virtual machines from different locations within the cloud computing network. Additionally, because the client applications are operated on virtual machines, the service provider may utilize the example methods, apparatus, and articles of manufacture described herein to dynamically move and/or support different network traffic loads by allocating and/or configuring the appropriate network elements. The computing and network resources are portable because the resources are virtualized. In this manner, traffic loads can be dynamically manipulated by moving computing and associated network resources to area of a network or data center where spare capacity is available.

In the interest of brevity and clarity, throughout the following disclosure, reference will be made to an example communication system 100 of FIG. 1. However, the methods, articles of manufacture, and apparatus described herein to provision cloud computing network elements are applicable to other types of networks constructed using other network technologies, topologies and/or protocols.

FIG. 1 illustrates the example communication system 100 that includes a cloud computing network manager 102 and a cloud computing network 104. The cloud computing network manager 102 provisions and/or configures cloud computing resources and network elements within the cloud computing network 104. The example communication system 100 also includes a routing/switching network 106 (e.g., the Internet). The routing/switching network 106 may include any MPLS to implement a Layer-3 VPN, a VPLS to implement a Layer-2 VPN across a WAN, a Layer-1 network with a shared transport mechanism that is dynamically allocated concurrently among many clients, and/or any other type of routing/switching service to implement a VPN. The routing/switching network 106 includes any number and/or types of routers, switches, servers, etc. to enable communications (e.g., packet-based data) between clients (e.g., a client 108), customers (e.g., customers 110) and/or the cloud computing network 104.

In the illustrated example, the client 108 is communicatively coupled to the cloud computing network 104 via a private network 112 and the routing/switching network 106. In some examples, the private network 112 may tunnel through the routing/switching network 106 (e.g., via a dedicated logical route associated with the client 108) to couple to the cloud computing network 104. The client 108 may include any enterprise, business entity, and/or collection of computing resources that are coupled together via the private network 112. The private network 112 includes any type of VPN including, for example, an IP Security (IPSec) VPN, a Layer-3 MPLS VPN (e.g., AT&T's AVPN service), a VPLS network (e.g., AT&T's OPT-E-WAN) and/or any other proprietary private network.

The customers 110 are users who may subscribe to services operated by a virtual machine and managed by the client 108. The customers 110 may also be users who purchase goods sold by the client 108 via a virtual machine. In some examples, a client 108 may request a virtual machine to host enterprise applications not available to the customers 110.

The cloud computing network 104 is any type of virtualized network that includes routers, switches, and servers that provide cloud computing resources to clients and/or customers based on, for example, usage requirements, bandwidth, processor efficiency, etc. The cloud computing network 104 includes servers 120 and 122 for hosting cloud computing resources, routers and switches that support a data center connector 124, and a WAN connector 126. The server 120 hosts virtual machines VM A1 and VM A2 and the server 122 hosts virtual machines VM B1 and VM B2. The servers 120 and 122 may be located within a single site location or, alternatively, may be located at a plurality of site locations within the cloud computing network 104. Additionally, the cloud computing network 104 may include other routers, logical routers, servers, VLANs, and/or switching networks that may be distributed across one or more sites located at different physical locations. Each of the virtual machines VM A1, VM A2, VM B1 and VM B2 may be assigned an IP address. Additionally or alternatively, a logical interface of each virtual machine may be assigned a media access control (MAC) address.

The example WAN connector 126 and the example data center connector 124 route communications from the client 108 and/or the customers 110 to the appropriate virtual machine VM A1, VM A2, VM B1, and/or VM B2. The connectors 124 and 126 route communications based on export, import, routing, and/or switching policies configured among logical and/or physical interfaces of the connectors 124 and 126. The example connectors 124 and 126 are representative of different combinations of network elements that communicatively couple the virtual machines VM A1, VM A2, VM B1, and/or VM B2 to the client 108 and/or the customers 110. For example, the WAN connector 126 may include different types of WAN connectors based on a network of the client 108 that is communicatively coupled to the cloud computing network 104. Similarly, the data center connector 124 may include different types of data center connectors based on a network connectivity for a virtual machine. Each of the different WAN connectors and data center connectors includes network objects that are provisioned to implement the particular connection. Different types of the connectors 124 and 126 are discussed in conjunction with FIG. 4.

The example WAN connector 126 provides interfaces between the routing/switching network 106 and the cloud computing network 104. In other words, the WAN connector 126 is a gateway to the cloud computing network 104. The WAN connector 126 includes a cloud routing network (e.g., Layer-2 MPLS-VPN) that communicatively couples to the routing/switching network 106 and/or the private network 112 by routing through the routing/switching network 106. The WAN connector 126 also includes an interface with the data center connector 124 that is based on a type of the cloud routing network.

The data center connector 124 provides an interface between the WAN connector 126 and cloud computing resources including, for example, the virtual machines VM A1, VM A2, VM B1, and/or VM B2. The data center connector 124 includes a routing network that couples the WAN connector 126 to the servers 120 and 122. The data center connector 124 also includes an interface with the WAN connector 126 based on a type of routing network to the servers 120 and/or 122. The example data center 124 may use address partitioning and/or packet tagging to route communications to the appropriate server 120 and/or 122 and/or the appropriate virtual machine VM A1, VM A2, VM B1, and/or VM B2.

To manage the connectors 124 and 126, the servers 120 and 122, and/or any other components of the cloud computing network 104, the example cloud computing network manager 102 includes a service orchestrator server 130, a compute orchestrator server 132, a network orchestrator server 134, and an IRSCP server 136. The example service orchestrator server 130 is an interface between a client administrator 138 and the cloud computing network manager 102. The service orchestrator server 130 enables the client administrator 138 to request a virtual machine by selecting from a list of cloud networking templates. In the example of FIG. 1, the client administrator 138 is associated with the client 108 and the private network 112.

The service orchestrator server 130 accesses the cloud networking templates from a template database 140. The cloud networking templates may be stored to the database 140 by cloud computing network personnel (e.g., service provider personnel) and/or automated systems that generate the templates based on any possible combinations of WAN connector types, data center connector types, and/or any other network objects. In some examples, the service orchestrator server 130 may enable the client administrator 138 to create a cloud networking template by selecting at least one WAN connector, at least one data center connector, and/or any other network objects. In these examples, the service orchestrator server 130 may store the newly created template to the database 140. The template database 140 may be implemented by Electronically Erasable Programmable Read-Only Memory (EEPROM), Random Access Memory (RAM), Read-Only Memory (ROM), and/or any other type of memory.

In the illustrated example of FIG. 1, the example client administrator 138 selects a cloud networking template based on a type of the private network 112. The client administrator 138 may also select a cloud networking template based on a type of routing network to couple to the virtual machines VM A1, VM A2, VM B1, and/or VM B2. The client administrator 138 may select the routing network based on a type of virtual machines, services to be offered by the virtual machines, and/or connectivity requirements for accessing the virtual machines.

In addition to offering a mechanism to enable clients to select from a catalog of cloud networking templates, the service orchestrator server 130 enables the client administrator 138 to provide location information, a client identification number, contact information, a required number and/or type of virtual cloud computing resources, activation/change/deactivation sequence management, information associated with the private network 112, and/or information associated with the customers 110. The service orchestrator server 130 may also enable a client to provide IP addresses associated with the private network 112 and/or an IP address domain (e.g., prefix) associated with computing resources linked together by the private network 112.

The example compute orchestrator server 132 uses the cloud networking template and/or any other information provided by the client administrator 138 to select and provision cloud computing resources (e.g., the servers 120 and 122 and/or the virtual machines VM A1, VM A2, VM B1, and VM B2) within the cloud computing network 104. In this manner, the example compute orchestrator server 132 initiates the creation of a computing portion of a virtual network cloud instance (VNCI) for the client 108. The VNCI is an allocation of cloud computing resources and/or network resources specifically reserved for the client 108. The example compute orchestrator server 132 configures cloud computing resources for the client 108 by accessing a resource database 142 that includes a list of available cloud resources across multiple physical locations serviced by the cloud computing network 104.

The resource database 142 may be updated as hardware and/or cloud computing resources are allocated and/or become available. In some examples, the resource database 142 may be updated by a monitoring server (not shown) as cloud computing resources are allocated or unallocated. In other examples, the resource database 142 may be updated by cloud computing personnel and/or automated systems responsible for the configuration of these cloud computing resources. The resource database 142 may be implemented by EEPROM, RAM, ROM, and/or any other type of memory.

Using the list of available cloud computing resources and information provided by the client administrator 138, the example compute orchestrator server 132 identifies a physical location of servers that has available capacity and/or is located relatively close to the client 108. Upon identifying a physical location, the example the compute orchestrator server 132 identifies a blade server within, for example, the servers 120 and 122 that is available to host the requested virtual machine VM A1, VM A2, VM B1, and VM B2. The example compute orchestrator server 132 then identifies, for example, an interface to the blade server, the server 120 associated with the blade server, and/or an enclosure of the server 120. The example compute orchestrator server 132 transmits identifiers of the blade server, the interface, the server 120, and the enclosure to the network orchestrator server 134 to communicatively couple the data center connector 124 to the virtual machine VM A1, VM A2, VM B1, and VM B2.

Additionally, the example compute orchestrator server 132 identifies VSwitches and Access Multiplexers within an enclosure and/or a blade server. The compute orchestrator server 132 may assign tags for the VSwitches and/or Access Multiplexers associated with the virtual machine VM A1, VM A2, VM B1, and VM B2 so that communications can be routed from the data center connector 124 to the appropriate interface of the blade server hosting the virtual machine VM A1, VM A2, VM B1, and VM B2. Further, the example compute orchestrator server 132 may allocate at least one Vkernel to function as an interface between the blade server hosting the virtual machine and application software operated by the virtual machine VM A1, VM A2, VM B1, and VM B2.

In addition to configuring virtual machines, the example compute orchestrator server 132 provisions any load balancers, firewalls, and/or disk space to provide support for the virtual machines VM A1, VM A2, VM B1, and VM B2. For example, load balances may be used to change allocations of a blade server that hosts a virtual machine based on network traffic. A firewall may restrict access to the virtual machine to authorized uses associated with the client 108 and/or the customers 110. A disk space may store data generated by applications operated by a virtual machine, data utilized by the applications, and/or may provide a backup of the memory state of a virtual machine.

To communicatively couple, for example, the virtual machine VM A1 to the client 108, the cloud computing network manager 102 includes the network orchestrator server 134. The example network orchestrator server 134 uses the cloud networking template selected by the client administrator 138 to configure the WAN connector 126, the data center connector 124, and/or any other network objects. The network orchestrator server 134 may access a network resource database 144 to determine which portions of routers and/or switches within an iPE router can be utilized to establish a connection through the cloud computing network 104 to the provisioned virtual machine. The connectors 124 and/or 126 may be included within an iPE router.

The network resource database 144 may also include instructions for provisioning network elements and corresponding network objects based on the selected cloud networking template. For example, the network resource database 144 may identify a type of cloud network and/or interface to implement for a specific type of WAN connector. Cloud computing network personnel may store the instructions to the network resource database 144. Additionally, available routes may be specified by the personnel and/or may be detected by the cloud computing network manager 102. The network resource database 144 may be implemented by EEPROM, RAM, ROM, and/or any other type of memory.

The example network orchestrator server 134 may also use information about the private network 112 of the client 108 to provision network resources. For example, the network orchestrator server 134 may receive VPN configuration information associated with the private network 112 that the network orchestrator server 134 uses to define export and/or import policies for the WAN connector 126. The network orchestrator server 134 may also receive Border Gateway Protocol (BGP), VPLS, and/or VPN control plane information to communicatively couple the WAN connector 126 to the private network 112 via routers within the routing/switching network 106. Further, the network orchestrator server 134 may receive from the client administrator 138 network and customer traffic information to provision the WAN connector 126 and/or the data center connector 124 for the customers 110.

To provision the WAN connector 126 and/or the data center connector 124, the example network orchestrator server 134 of FIG. 1 partitions routing space within, for example an iPE router. In other examples, the network orchestrator server 134 may partition routing space on switches and/or any other network connectivity components. To provision routing space, the example network orchestrator server 134 identifies physical interfaces on the WAN connector 126 and the data center connector 124 and partitions logical interfaces from the physical interfaces to create a virtual route. In this manner, the network orchestrator server 134 creates a virtual switch using the WAN connector 126 and the data center connector 124. Based on a type of the connectors 124 and 126 specified by the cloud networking template, the example network orchestrator server 134 provisions a routing network to couple the WAN connector 126 to the routing/switching network 106 and provisions a routing network to couple the data center connector 124 to the servers 120 and 122 hosting the requested virtual machine. Examples of network objects and routing networks that may be implemented by the example network orchestrator server 134 are described in conjunction with FIG. 4.

In examples where the client 108 requests virtual machines at different locations and/or where the compute orchestrator server 132 provisions a virtual machine on multiple servers, the network orchestrator server 134 creates a bridging domain network object. The bridging domain may be a network element that routes communications between a virtual machine hosted by different servers. In some examples, the network orchestrator server 134 configures a bridging domain network object within the data center connector 124 by referencing tags associated with the virtual machines VM A1, VM A2, VM B1, VM B2 to virtual routes of the data center connector 124. In this manner, separate iPE routers within the cloud computing network 104 may forward communications between, for example, the virtual machines VM A1, VM A2, VM B1, VM B2 hosted on the separate servers 120 and 122.

The example network orchestrator server 134 also stores network connection settings for the client 108 to a client information database 146. The network orchestrator server 134 may use the stored connection settings to create additional connections for the client 108 through the cloud computing network 104 based on traffic flow. The example network orchestrator server 134 may also use the connection settings to provision connections to the client 108 from virtual machines at other physical locations. Additionally, cloud computing network personnel may use the connection settings to troubleshoot any issues. The client information database 146 may be implemented by EEPROM, RAM, ROM, and/or any other type of memory.

Additionally, the example network orchestrator server 134 configures an interface of the data center connector 124 to communicatively couple to a corresponding interface of the WAN connector 126 to create a virtual route. The network orchestrator server 134 may create this virtual route by specifying export and/or import policies of the interface to accept communications associated with the client 108. In a similar manner, the network orchestrator server 134 and/or the IRSCP server 136 may couple together the WAN connector 126, the data center connector 124, and the routing/switching network 106 to enable the customers 110 to access virtual machines VM A1, VM A2, VM B1, VM B2.

To logically couple together the WAN connector 126, the data center connector 124, and/or the private network 112, the example cloud computing network manager 102 includes the IRSCP server 136. The example IRSCP server 136 updates import and export policies of the WAN connector 126 so that an interface of the WAN connector 126 may accept communications from and transmit communications to the private network 112. The IRSCP server 136 updates policies by adding routing information associated with the client 108 to a list of allowed and/or authorized routes. Alternatively, the IRSCP server 136 may update policies by adding an IP address space associated with the client 108 to a list of allowed and/or authorized IP addresses.

The example IRSCP server 136 may also update routing and forwarding tables within the WAN connector 126 with the export and import policies so that communications received from the private network 112 are forwarded along the appropriate virtual route through the connectors 124 and 126. The IRSCP server 136 may also update import and/or export polices so that communications from the client 108 and/or the private network 112 are forwarded along an appropriate routing network of the cloud computing network 104 and/or the routing/switching network 106. For example, the IRSCP server 136 may specify that communications received from the private network 112 associated with a VPN are forwarded along a Layer-3 MPLS-VPN supported by the WAN connector 126.

While the example cloud computing network manager 102 has been illustrated in FIG. 1, one or more of the servers, platforms, interfaces, data structures, elements, processes and/or devices illustrated in FIG. 1 may be combined, divided, re-arranged, omitted, eliminated and/or implemented in any way. Further, the example servers 120 and 122, the example data center connector 124, the example WAN connector 126, the example service orchestrator server 130, the example compute orchestrator server 132, the example network orchestrator server 134, the example IRSCP server 136, the example template database 140, the example resource database 142, the example network resource database 144, the example client information database 146, and/or more generally, the example cloud computing network manager 102 may be implemented by hardware, software, firmware and/or any combination of hardware, software and/or firmware. Thus, for example, any of the example servers 120 and 122, the example data center connector 124, the example WAN connector 126, the example service orchestrator server 130, the example compute orchestrator server 132, the example network orchestrator server 134, the example IRSCP server 136, the example template database 140, the example resource database 142, the example network resource database 144, the example client information database 146, and/or more generally, the example cloud computing network manager 102 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example servers 120 and 122, the example data center connector 124, the example WAN connector 126, the example service orchestrator server 130, the example compute orchestrator server 132, the example network orchestrator server 134, the example IRSCP server 136, the example template database 140, the example resource database 142, the example network resource database 144, and/or the example client information database 146 are hereby expressly defined to include a computer readable medium such as a memory, DVD, CD, etc. storing the software and/or firmware. Further still, the example cloud computing network manager 102 may include one or more elements, processes and/or devices in addition to, or instead of, those illustrated in FIG. 1, and/or may include more than one of any or all of the illustrated elements, processes and devices.

Figure 2:
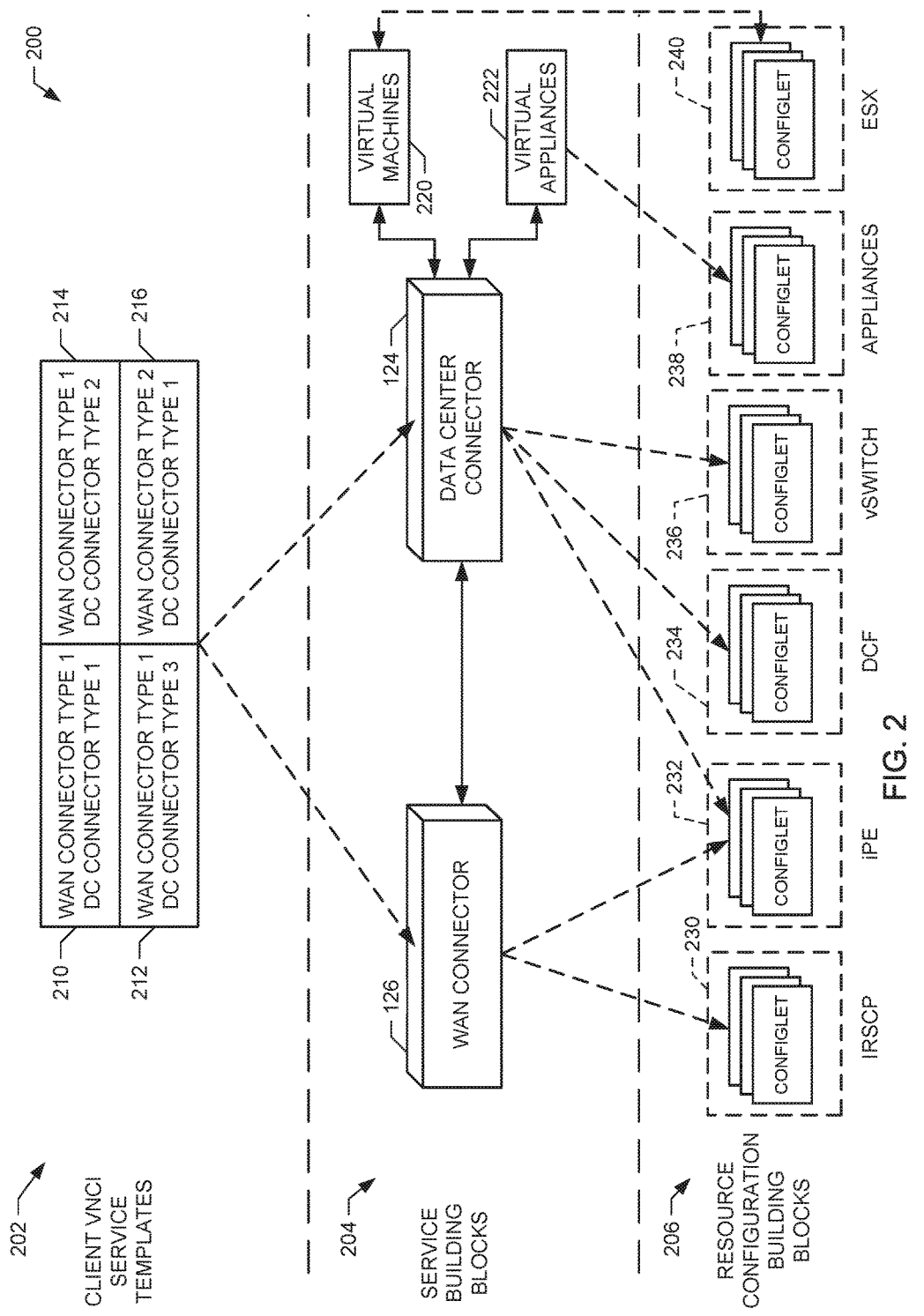
FIG. 2 shows a diagram of an example framework for provisioning a Wide Area Network (WAN) connector and a data center connector of FIG. 1.

FIG. 2 shows a diagram of an example framework 200 for provisioning the WAN connector 126 and the data center connector 124 of FIG. 1. The example framework 200 includes a client VNCI service template layer 202, a service building blocks layer 204, and a resource configuration building blocks layer 206. In other examples, the framework 200 may include additional or fewer layers. In yet other examples, the layers 202-206 may be rearranged and/or may be combined.

The example client VNCI service template layer 202 is implemented by the example service orchestrator server 130 of FIG. 1. This layer 202 includes cloud networking templates 210-216 that the client administrator 138 selects to cause the cloud computing network manager 102 to provision a VNCI by configuring the connectors 124 and 126. In other examples, the service orchestrator server 130 may provide additional cloud networking templates.

The example of FIG. 2 shows some cloud networking templates 210-216 that may be provided to the client administrator 138 via the service orchestrator server 130. In this example, the templates 210-216 enable the client administrator 138 to select from a combination of a WAN connector type and a data center (DC) connector type. In some examples, the cloud networking templates 210-216 may include combinations of multiple WAN connector types and/or data center connector types. For example, a cloud networking template may include a Type 1 WAN connector, a Type 2 WAN connector, and a Type 2 data center connector. The types of the connectors 124 and 126 are described in further detail in conjunction with FIG. 4.

The example service building blocks layer 204 includes network elements (e.g., the connectors 124 and 126) and cloud computing resources (e.g., virtual machines 220 and virtual appliances 222). The virtual machines 220 may be similar to the virtual machines VM A1, VM A2, VM B1, and/or VM B2 of FIG. 1. The virtual appliances 222 may include a load balancer, a firewall, and/or a disk platform to facilitate the operation of the virtual machines 220. The virtual machines 220 and the virtual appliances 222 are provisioned within the service building blocks layer 204 by the compute orchestrator server 132 of FIG. 1. The connectors 124 and 126 are provisioned within the service building blocks layer 204 by the network orchestrator server 134. The type of the connectors 124 and 126 is determined by the client administrator 138 selecting one of the cloud networking templates 210-216. Additionally, the types of the virtual machines 220 and/or the virtual appliances 222 may be determined by the client administrator 138 selecting one of the cloud networking templates 210-216 and/or by the client administrator 138 providing address and/or configuration information.

To provision the connectors 124 and 126, the service building blocks layer 204 utilizes network objects that are specified by respective configlets 230-236 within the resource configuration building blocks layer 206. Additionally, to provision the virtual machines 220 and the virtual appliances 222, the service building blocks layer 204 utilizes cloud computing resources that are specified by respective configlets 238 and 240. The configlets 230-240 provide definitions for network objects and are associated with a configuration management build function. The configlets 230-240 may be reusable for different types of the cloud networking templates 210-216. The example configlets 230-240 enable network objects and cloud computing resources to be linked together within the service building block layer 204 based on specific parameters of the client administrator 138 passing between the configlets 230-240. A configuration management build function is associated with at least one resource management function to provision network objects and/or elements within the service building blocks layer 204 based on unique configuration parameters specified by the client administrator 138 via the cloud networking templates 210-216. In this example, the same resource management function can be instantiated by multiple configuration management functions.

In the example of FIG. 2, the IRSCP configlet 230 specifies one or more network objects that couple the WAN connector 126 to, for example, the private network 112 via the cloud computing network 104. The iPE configlet 232 specifies one or more network objects implemented within an iPE router that routes communications associated with the client 108 through the WAN connector 126 and/or the data center connector 124. The data center fabric (DCF) configlet 234 specifies one or more network objects that interface with the data center connector 124. In some examples, DCF configlet 234 may specify that the data center connector 124 is to interface with the WAN connector 126. The vSwitch configlet 236 specifies how the data center connector 124 is to route communications associated with the client 108 to the virtual machines 220 and/or the virtual appliances 222 via one or more network objects. The appliances configlet 238 specifies network object(s) to implement and/or provision the virtual appliances 222. For example, the appliance configlet 238 may include a network object disk storage routine to store data associated with the virtual machines 220. Further, the ESX configlet 240 specifies one or more network objects that are to provision and/or operate one or more applications on the virtual machines 220.

Figure 3:
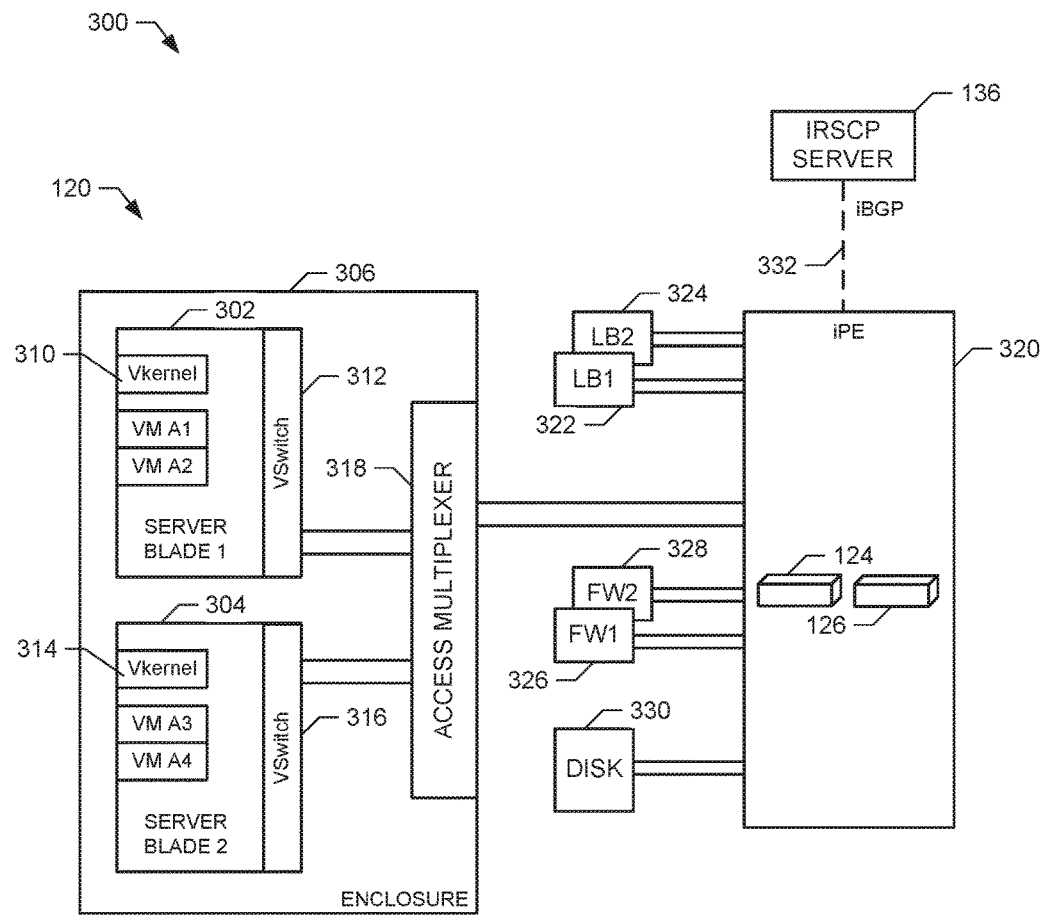
FIG. 3 shows an example hardware configuration to provision virtual machines on a server.

FIG. 3 shows an example hardware configuration 300 to implement the example virtual machines VM A1 and VM A2 of FIG. 1. The hardware configuration includes the server 120, which is implemented by a first blade server 302 and a second blade server 304. In other examples, the server 120 may include additional or fewer blade servers. The blade servers 302 and 304 located in an enclosure 306. While the blade servers 302 and 304 are each shown with two virtual machines, the blade servers 302 and 304 may include additional virtual machines. Additionally, while the illustrated example shows the server 120, FIG. 3 may include additional servers. Further, while the enclosure 306 is shown, other examples may include multiple enclosures included within a server rack to implement the example server 120.

The first blade server 302 includes a Vkernal 310 and a VSwitch 312. Similiarly, the second blade server 304 includes a Vkernal 314 and a VSwitch 316. The Vkernals 310 and 314 function as an interface between the respective blade servers 302 and 304 and applications operated by the respective virtual machines VM A1-VM A4. In other words, the Vkernals 310 and 314 virtualize the respective blade servers 302 and 304 to host the corresponding virtual machines VM A1-VM A4. Each of the virtual machines VM A1-VM A4 may be associated with a resource endpoint instance and identified by at least one tag. The VSwitches 312 and 316 route communications received by the respective blade server 302 and 304 to the appropriate virtual machine VM A1-VM A4. For communications transmitted by the virtual machines VM A1-VM A4, the respective VSwitches 312 and 316 identify an interface that received the communication to determine which of the virtual machines VM A1-VM A4 transmitted the communication. The VSwitches 312 and 316 then affix to communication an identifier and/or tag of the corresponding virtual machine VM A1-VM A4 and forward the communication to an Access Multiplexer 318. For communications destined for the virtual machines VM A1-VM A4, the VSwitches 312 and 316 use a tag, an identifier, an endpoint, and/or a destination address included within the communication to select the appropriate virtual machine VM A1-VM A4. The VSwitches 312 and 316 then forward the communication to the selected virtual machine VM A1-VM A4.

The example Access Multiplexer 318 routes communications between the blade servers 302 and 304 and an iPE router 320. The Access Multiplexer 318 may be coupled to the iPE router 320 by, for example, a 10 Gigabit Ethernet (GE) link. The example Access Multiplexer 318 functions as a logical router and/or virtual switch to route communications between the blade servers 302 and 304 and the iPE router 320. The example Access Multiplexer 318 affixes to communications a tag and/or identifier associated with the VSwitch 316 and 318 that transmitted the communications. In this manner, the Access Multiplexer 318 tags communications so that the iPE router 320 may use the tag to determine to which client (e.g., the client 108) and/or virtual machine the communications are to be routed. The example Access Multiplexer 318 also uses tags, identifiers, addresses, and/or endpoints included within communications received from the iPE router 320 (e.g., communications originating at the client 108) to determine the appropriate blade server 302 and 304 to forward the communications. The Access Multiplexer 318 then forwards the communications to the appropriate VSwitch 312 and 316.

The example iPE router 320 includes any type of provider edge router. The iPE router 320 may be communicatively coupled to the server 120 via, for example, 4-port 10GE Fiber Card(s). While the iPE router 320 is shown in FIG. 3, other examples may include other iPE routers communicatively coupled to the server 120.

The example iPE router 320 of the illustrated example routes communications from the enclosure 306 (e.g., the server 120) to the appropriate client and/or customer. The example iPE router 320 of FIG. 3 includes the data center connector 124 and the WAN connector 126 of FIGS. 1 and 2. The connectors 124 and 126 are provisioned based on a cloud networking template selected by, for example, the client 108. In this manner, the connectors 124 and 126 route communications through the iPE router 320 using routing protocols and/or routing networks that are compatible with, for example, the private network 112 of the client 108. Thus, the connectors 124 and 126 enable the cloud computing network manager 102 to communicatively couple virtual machines to iPE routers using a common coupling scheme (e.g., the Access Multiplexer 318, the VSwitches 312 and 316, and/or the blade servers 302 and 304) regardless of a type of routing and/or network protocol used by the client.

The example iPE router 320 is also communicatively coupled to load balances 322 and 324, firewalls 326 and 328, and a disk platform 330. The example load balancers 322 and 324 manage which of the blade servers 302 and 304 hosts which of the virtual machines VM A1-VM A4. By coupling to the iPE router 320, the load balancers 322 and 324 may monitor and shift cloud computing resources among each server coupled to the iPE router 320. For example, if the load balancer 322 detects that the blade server 302 is close to processing capacity, the load balancer 322 may migrate the virtual machine VM A2 to the blade server 304 via the iPE router 320.

The example firewalls 326 and 328 provide restricted access to the virtual machines VM A1-VM A4 based on conditions specified by, for example, the client administrator 138. In this manner, the firewalls 326 and 328 may restrict unauthorized communications from passing from the iPE router 320 to the Access Multiplexer 318. The example disk platform 330 stores data and/or memory states associated with the virtual machines VM A1-VM A4. The disk platform 330 may also store routing information associated with the iPE router 320. By storing data and/or a memory state within the centrally located disk platform 330, the data and/or memory state of a virtual machine does not have to be migrated when a virtual machine is moved between blade servers and/or servers.

The example iPE router 320 is communicatively coupled to the IRSCP server 136 of FIG. 1. The example network orchestrator server 134 communicatively couples the data center connector 124 to the WAN connector 126 within the iPE router 320. The example IRSCP server 136 communicatively couples the WAN connector 126 to, for example, the private network 112 of the client 108 via infrastructure BGP (iBGP) route advertising 332. The IRSCP server 136 couples the WAN connector 126 to the private network 112 by specifying export and/or import policies associated with routes of the client 108 to routers within the routing/switching network 106 and/or to the WAN connector 126. In this manner, the IRSCP server 136 creates virtual routes between the routers within the routing/switching network 106 designated for communications between the client 108 and the virtual machines VM A1-VM A4. The export and import policy management by the IRSCP server 136 is described further in conjunction with FIG. 6.

Figure 4:
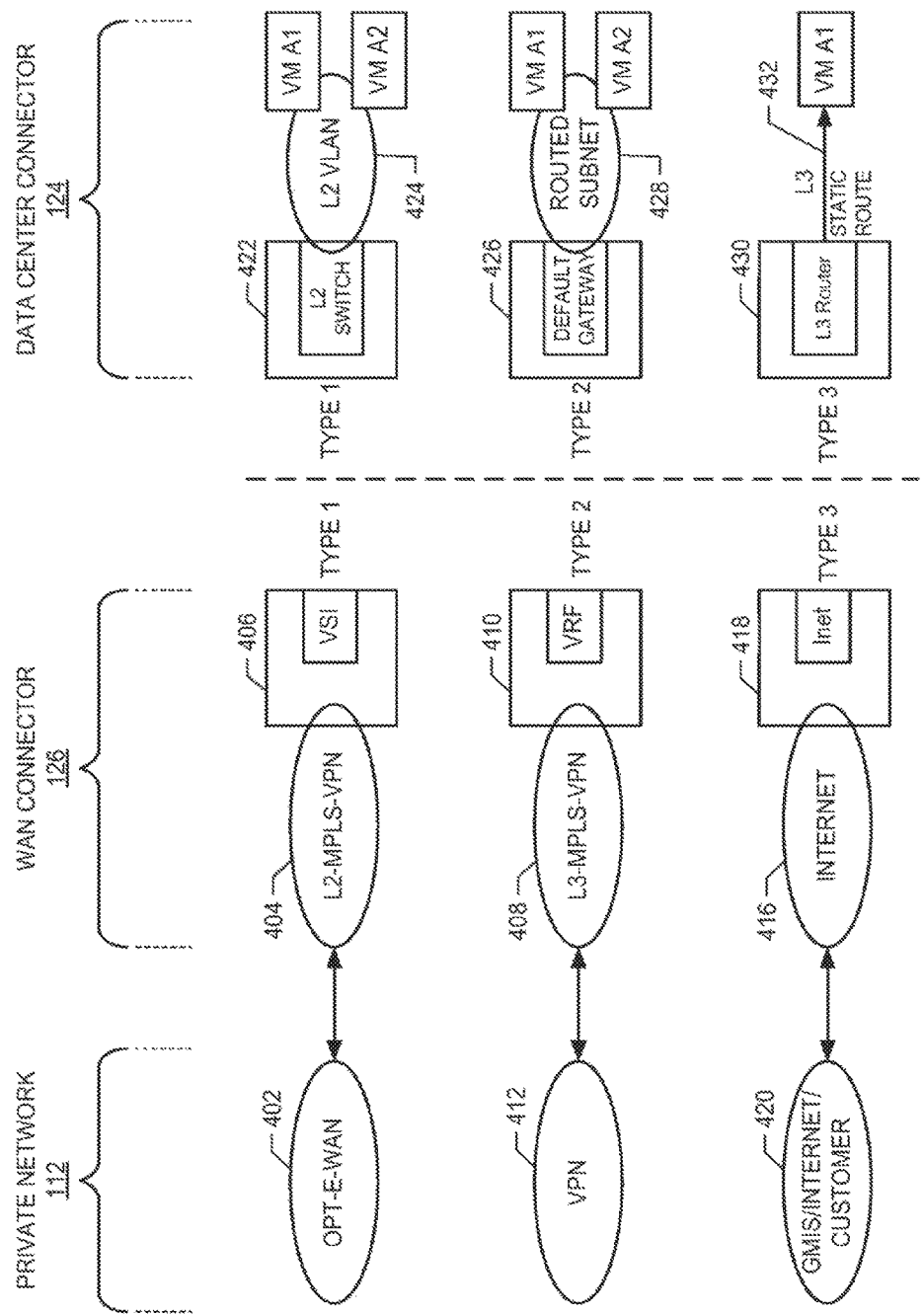
FIG. 4 shows example types of the data center connector and the WAN connector of FIGS. 1-3.

FIG. 4 shows example types of the data center connector 124 and the WAN connector 126 of FIGS. 1-3. The example connectors 124 and 126 are shown being implemented by network objects based on a type of the connectors 124 and 126. The different types (e.g., Types 1-3) of the connectors 124 and 126 are selectable by the client administrator 138 via cloud networking templates. The cloud networking templates may include any combination and/or number of the types of the connectors 124 and/or 126. While the illustrated example shows three type of the connectors 124 and 126, other examples may include additional types of the connectors 124 and 126. Additionally, the private network 112 may be communicatively coupled to the WAN connector 126 by tunneling though the switching network 102 of FIG. 1 via specified virtual and/or logical routes.

The type of the WAN connector 126 is based on a type of the private network 112 of the client 108 that is to communicatively couple to the WAN connector 126. In other words, the network objects of the WAN connector 126 are selected to be compatible with the private network 112 of the client 108. For example, if the private network 112 is implemented by an OPT-E-WAN 402, the WAN connector 126 includes a Layer-2 MPLS-VPN 404 (e.g., a network object). The Layer-2 MPLS-VPN provides Layer-2 Ethernet VPN connectivity via the cloud computing network 104 to the private network 112 of the client 108. The Layer-2 MPLS-VPN 404 is communicatively coupled to an iPE router (e.g., the iPE router 320 of FIG. 3) via a Virtual Switch Instance (VSI) 406. The VSI 406 is a logical interface of a physical interface of an iPE router. The Layer-2 MPLS-VPN 404 and the VSI 406 are network objects that are combined together to form the Type 1 WAN connector.

The Type 2 WAN connector includes a Layer-3 MPLS-VPN 408 that is communicatively coupled to a Virtual Routing and Forwarding (VRF) interface 410 of an iPE router. The Layer-3 MPLS-VPN 408 is compatible with a VPN 412 (e.g., AVPN) implemented as the private network 112. The Layer-3 MPLS-VPN 408 may also be compatible with Layer-3 MPLS-VPNs implemented as, for example, the private network 112 of the client 138.

The Type 3 WAN connector 126 includes an Internet network 416 that is communicatively coupled to an Internet interface 418 of an iPE router. The Internet interface 418 may include an Internet routing table for routing communications to an appropriate data connector. In this example, the Internet network 416 may include any Layer-3 switching network including, for example, the routing/switching network 106 of FIG. 1. Thus, in this example, the cloud computing network 104 that interfaces with a client network is implemented by the Internet. The Internet network 416 is compatible with any customer network 420 including, for example, an Intranet, a LAN, and/or a network of the customers 110 (e.g., AT&T's Global Managed Internet Service (GMIS)). In this example, the Internet network 416 and the Internet interface 418 are network objects of the WAN connector 126.

FIG. 4 also shows three types of the data center connector 124. The types of the data center connector 124 may be selected by, for example, the client 108 based on a type of access desired for requested virtual machines VM A1 and VM A2. The type of the data center connector 124 may also be based on a type of the virtual machines VM A1 and VM A2 and/or a number of different connections to the virtual machines VM A1 and VM A2. In this example, the virtual machines VM A1 and VM A2 are similar to the virtual machines VM A1 and VM A2 described in conjunction within FIGS. 1-3.

The Type 1 data center connector 124 may be utilized when the client 108 has different types of data center connections to the virtual machines VM A1 and VM A2. The Type 1 data center connector 124 includes a Layer-2 Switch interface 422 of an iPE router communicatively coupled to a Layer-2 VLAN 424. In other examples, the Type 1 data center connector 124 may include a default gateway and/or a firewall interface.

The Layer-2 VLAN 424 of the illustrated example provides connectivity among endpoints (e.g., MAC addresses of the virtual machines VM A1 and VM A2) within a subnet. In this manner, the Layer-2 VLAN 424 enables other data center connections to communicatively couple to the Layer-2 VLAN 424 to route communications based on destination address endpoints. For clarity and brevity, the example shows the Layer-2 VLAN 424 coupled directly to the virtual machines VM A1 and VM A2. However, the Layer-2 VLAN 424 couples to the virtual machines VM A1 and VM A2 via the Access Multiplexer 318 and the VSwitch 302 of the server 120, as described in conjunction with FIG. 3.

The Type 2 data center connector 124 includes a Default Gateway interface 426 to an iPE router that provides Layer-3 connectivity to external networks via the WAN connector 126. The Type 2 data center connection 124 couples the Default Gateway interface 426 to the virtual machines VM A1 and VM A2 via a routed subnet 428. The routed subnet 428 may be implemented by a Layer-2 Ethernet VLAN including, for example, a Virtual Router Redundancy Protocol (VRRP) and/or a Dynamic Host Configuration Protocol (DHCP) Relay.

The Type 3 data center connector 124 includes a Layer-3 router interface 430 that provides Layer-3 connectivity to external networks via the WAN connector 126. The Type 3 data center connection 124 couples the Layer-3 router interface 430 to the virtual machine VM A1 via a static route 432. The example static route 432 may be implemented by, for example, point-to-point VLAN access. In this example, the Layer-3 router interface 430 is communicatively coupled to servers via a respective static route. The Layer-3 router interface 430 may select the appropriate static route to route communications based on an endpoint, IP address, tag, and/or identifies included within the communications.

Figure 5:
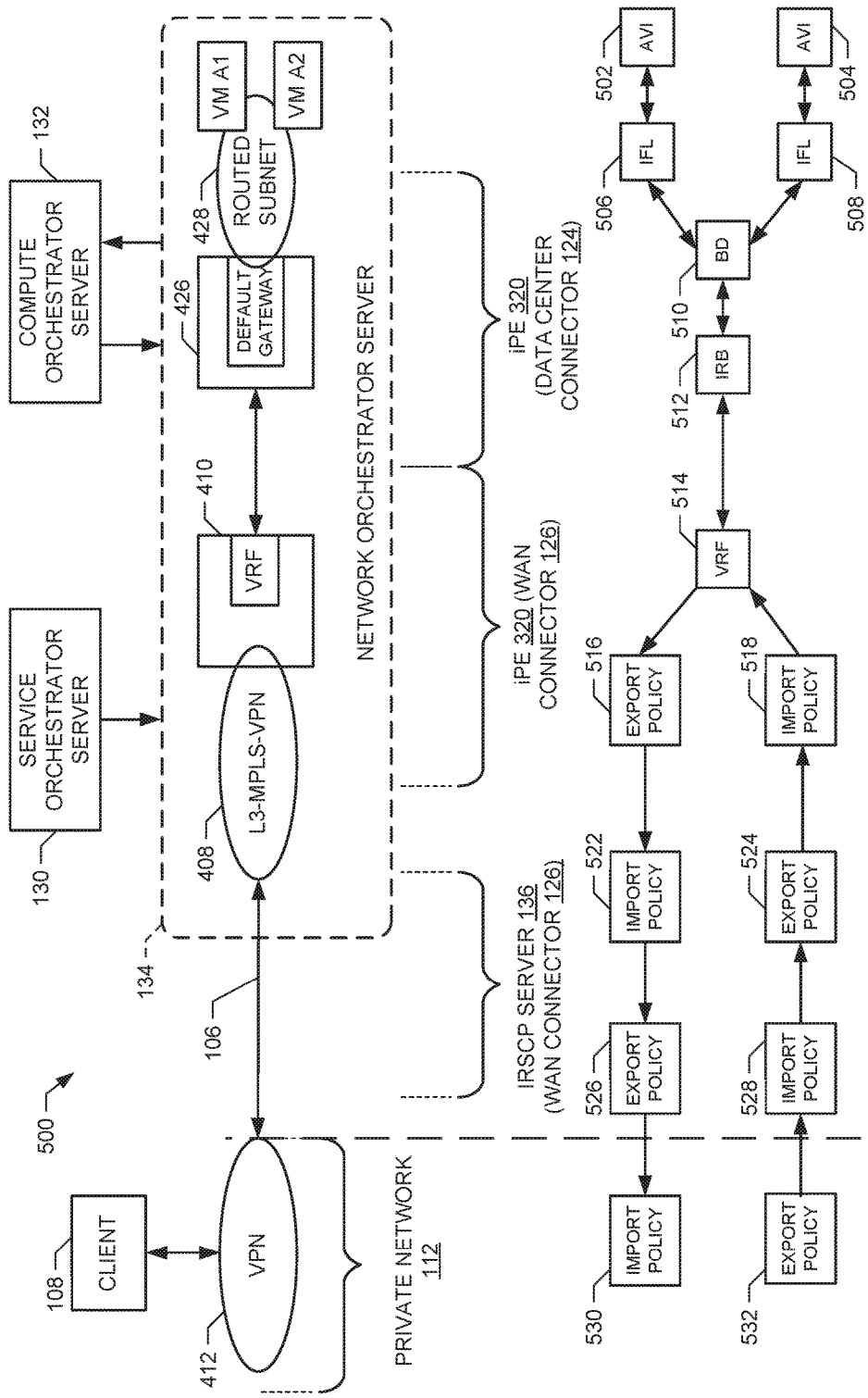
FIG. 5 shows an example VNCI that includes a Type 2 WAN connector communicatively coupled a Type 2 data center connector.

FIG. 5 shows an example VNCI 500 that includes a Type 2 WAN connector 126 communicatively coupled to a Type 2 data center connector 124. The example VNCI 500 shows how the servers 130-136 provision the connectors 124 and 126 to communicatively couple the private network 112 of the client 108 to the virtual machines VM A1 and VM A2. In this example, the private network 112 is implemented by the VPN 412 of FIG. 4.

In the illustrated example, the service orchestrator server 130 of FIG. 1 provides the network orchestrator server 134 a selection of a cloud networking template that includes the Type 2 WAN connector 126 and the Type 2 data center connector 124. The service orchestrator server 130 may also provide a number and/or type of cloud computing resources for the selected template, a client identification number of the client 108, a VRF identification number of the private network 112, and/or an IP subnet prefix associated with the client 108. The network orchestrator server 134 uses the cloud networking template to provision the Type 2 connectors 124 and 126 using the network objects 408, 410, 426 and 428.

The example compute orchestrator server 132 uses information from the client 108 (e.g., the client administrator 138 of FIG. 1) to provision the virtual machines VM A1 and VM A2 within, for example, the server 120 of FIGS. 1 and 3. The compute orchestrator server 132 transmits to the network orchestrator server 134, for example, blade server and/or enclosure identifiers (e.g., tags) for the provisioned cloud computing resources (e.g., the virtual machines VM A1 and VM A2). The network orchestrator server 134 links the identifiers to identifiers of the network objects 408, 410, 426 and/or 428. The network orchestrator server 134 may transmit to the compute orchestrator server 130, for example, Access VLAN identifiers (AVIs) assigned to the virtual machines VM A1 and VM A2 and/or any unassigned IP addresses associated with the IP subnet prefix of the client 108. In this manner, the servers 132 and 134 provision a virtual route by coupling together identifiers of the network objects 408, 410, 426, and 428 to identifiers of cloud computing resources.

After the Type 2 connectors 124 and 126 are provisioned, the network orchestrator server 134 and/or the IRSCP server 136 couples the network objects 408, 410, 426, and 428 to the private network 112 and to cloud computing resources (e.g., the virtual machines VM A1 and VM A2). The network orchestrator server 134 assigns AVIs 502 and 504 to the respective virtual machines VM A1 and VM A2 and/or corresponding VLANs. The AVIs 502 and 504 are endpoint identifiers that identify the virtual machines VM A1 and VM A2 within the routed subnet 428. The example network orchestrator server 134 couples the AVIs 502 and 504 to respective Logical Interfaces (IFLs) 506 and 508 of the Default Gateway interface 426. The IFLs 506 and 508 may be, for example, logical interfaces defined on Layer-2 802.1Q physical interfaces of an iPE router. The network orchestrator server 134 assigns the AVIs 502 and 504 to the respective IFLs 506 and 508 so that the Default Gateway interface 426 can route communications to the appropriate virtual machine VM A1 and/or VM A2 based on the AVIs 502 and 504. Additionally, the network orchestrator server 134 may assign virtual machine, blade server, and/or enclosure identifiers to the IFLs 506 and 508.

The example network orchestrator server 134 of FIG. 5 communicatively couples together the IFLs 506 and 508 within the Default Gateway 426 of the data center connector 124 by specifying a bridging domain network object 510. The example bridging domain network object 510 provides Layer-2 coupling across, for example, the IFLs 506 and 508 for inter-VLAN connectivity. The example network orchestrator server 134 may assign to the bridging domain network object 510 one or more VLAN identifier(s) (e.g., tags) and/or identifiers of the coupled IFLs 506 and 508.

The example network orchestrator server 134 couples the bridging domain network object 510 to an Integrated Routing and Bridging (IRB) network object 512. The IRB network object 512 provides Layer-3 routing support for the bridging domain network object 510. The example network orchestrator server 134 may assign to the IRB network object 512 an IRB unit number, an IP subnet prefix and/or an IP address of the Default Gateway interface 426.

In the illustrated example of FIG. 5, the IRSCP server 136 and/or the network orchestrator server 134 communicatively couples the data center connector 124 to the WAN connector 126 by coupling the IRB network object 512 associated with the Default Gateway interface 426 to a VRF table 514 of the VRF interface 410. The IRB network object 512 may be coupled by storing the IRB unit number and/or corresponding IP subnet prefix to the VRF table 514. In this manner, any communications received by the VRF interface 410 from the Layer-3 MPLS-VPN 408 that include a destination address associated with the IP subnet prefix are forwarded by the VRF interface 410 to the Default Gateway interface 426.

The example VRF 514 also includes an export policy 516 and an import policy 518 specified by the network orchestrator server 134. The export policy 516 defines routing targets for the Layer-3 MPLS-VPN associated with the client 108. The routing targets may specify a target destination of the client 108 and/or the private network 112. In this manner, the export policy 516 defines a route from the VRF interface 410 through the Layer-3 MPLS VPN 408 designated for communications associated with the client 108. The import policy 518 defines a route through the Layer-3 MPLS VPN 408 to the VRF interface 410. In this manner, communications received by the Layer-3 MPLS VPN from the client 108 are forwarded along the route specified by the import policy 518 to the VRF interface 410. The import policy 518 may also specify a list of IP addresses and/or an IP address subnet prefix that is authorized for the VRF interface 410, thereby enabling authorized users to access the virtual machines VM A1 and VM A2.

To communicatively couple the WAN connector 126 to the private network 112, the IRSCP server 136 of FIG. 5 specifies an import policy 522 and an export policy 524 for routers of the routing/switching network 106 that are within proximity of the Layer-3 MPLS VPN 408 of the cloud computing network 104 (e.g., external routers that are neighbors to the iPE router 320 of FIG. 3). The import policy 522 instructs routers in the routing/switching network 106 to append routes from the cloud computing network 104 with a route target destination of the client 108. The export policy 524 extends a route from the VPN 412 to the Layer-3 MPLS-VPN 408 for communications transmitted from the client 108.

Further, the IRSCP server 136 specifies an export policy 526 and an import policy 528 for routers of the routing/switching network 106 that are within proximity of the VPN 412 (e.g., external routers that are neighbors to the VPN 412). The export policy 526 instructs routers in the routing/switching network 106 to append routes from the cloud computing network 104 with a route target destination of the client 108. The import policy 528 extends a route from the VPN 412 to the Layer-3 MPLS-VPN 408 for communications transmitted from the client 108 using a route target provided by the VPN 412.

The example of FIG. 5 also shows an import policy 530 and an export policy 532 that are specified by the client 108. The import policy 530 extends a logical route from the cloud computing network 104 with a route target destination of the client 108. The export policy 532 tags routes from the VPN 412 to the Layer-3 MPLS VPN 408 with an identifier (e.g., a route target) associated with the client 108. After the IRSCP server 136 specifies the policies 522-528 and/or modifies routes advertised and/or received by the policies 516, 518, 530 and 532, the client 108 may communicatively couple to the virtual machines VM A1 and VM A2.

Figure 6:
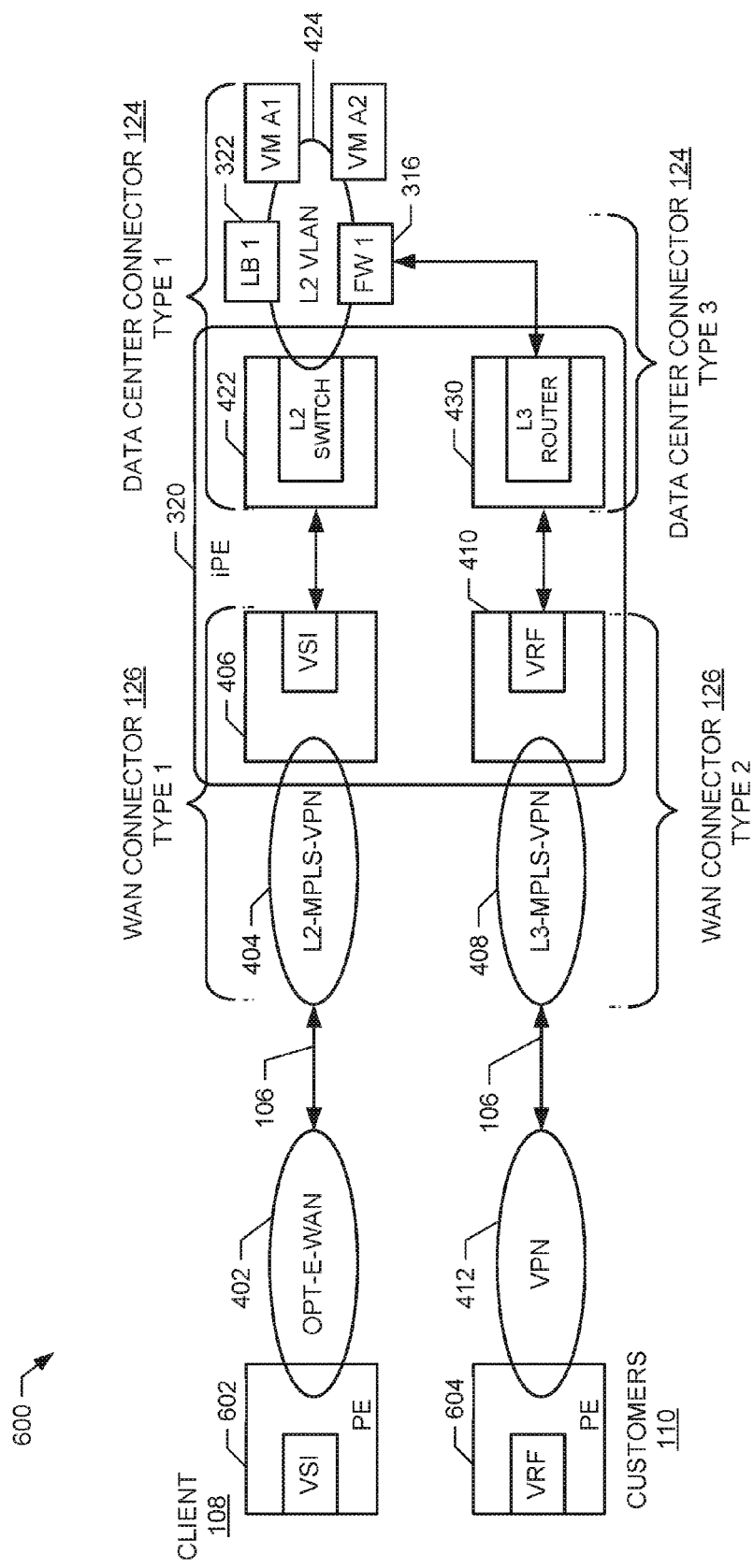
FIG. 6 shows an example VNCI that communicatively couples the client and the customers of FIG. 1 to virtual machines.

FIG. 6 shows an example VNCI 600 that communicatively couples the client 108 and the customers 110 of FIG. 1 to the virtual machines VM A1 and VM A2. In this example, the client administrator 138 of FIG. 1 selects a cloud networking template that includes the Type 1 and the Type 2 WAN connectors 126 and the Type 1 and the Type 3 data center connectors 124 described in conjunction with FIG. 4. In response to the client administrator 138 selecting the cloud networking template, the servers 130-136 of FIGS. 1 and 5 provision the network elements (e.g., the WAN connectors 126 and the data center connectors 124) by configuring the network objects 404, 406, 408, 410, 422, 424, and 430 in association with the iPE router 320 of FIG. 3.

Additionally, the compute orchestrator server 132 provisions the virtual machines VM A1 and VM A2 (including the corresponding blade server 302, VSwitch 312 and/or Access Multiplexer 318), the load balancer 322 and the firewall 316 of FIG. 3. The compute orchestrator server 132 provisions the firewall 316 to restrict the unauthorized customers 110 from accessing and connecting to the virtual machines VM A1 and VM A2 via the Type 2 WAN connector 126 and the Type 3 data center connector 124. The customers 110 access the virtual machines VM A1 and VM A2 through the firewall 316 via the Layer-2 VLAN 424 by addressing communications to endpoints of the machines VM A1 and VM A2.

The example IRSCP server 136 communicatively couples the Layer-2 MPLS-VPN 404 to the OPT-E-WAN 402 of the client 108 via an iPE router with a VSI interface 602. The example IRSCP server 136 also communicatively couples the Layer-3 MPLS-VPN 408 to the VPN 412 of the customers 110 via the iPE router with a VRF interface 604. In this manner, the example servers 130-136 provision the connectors 124 and 126 to communicatively couple the same virtual machines VM A1 and VM A2 to different end-users (e.g., the client 108 and the customers 110) regardless of the different routing networks associated with the end-users. Further, the example servers 130-136 enable the client administrator 138 to create the example VNCI 600 on-demand by selecting a cloud networking template because the network objects 404, 406, 408, 410, 422, 424, and 430 are pre-provisioned for each of the types of the connectors 124 and 126.

Figure 7:
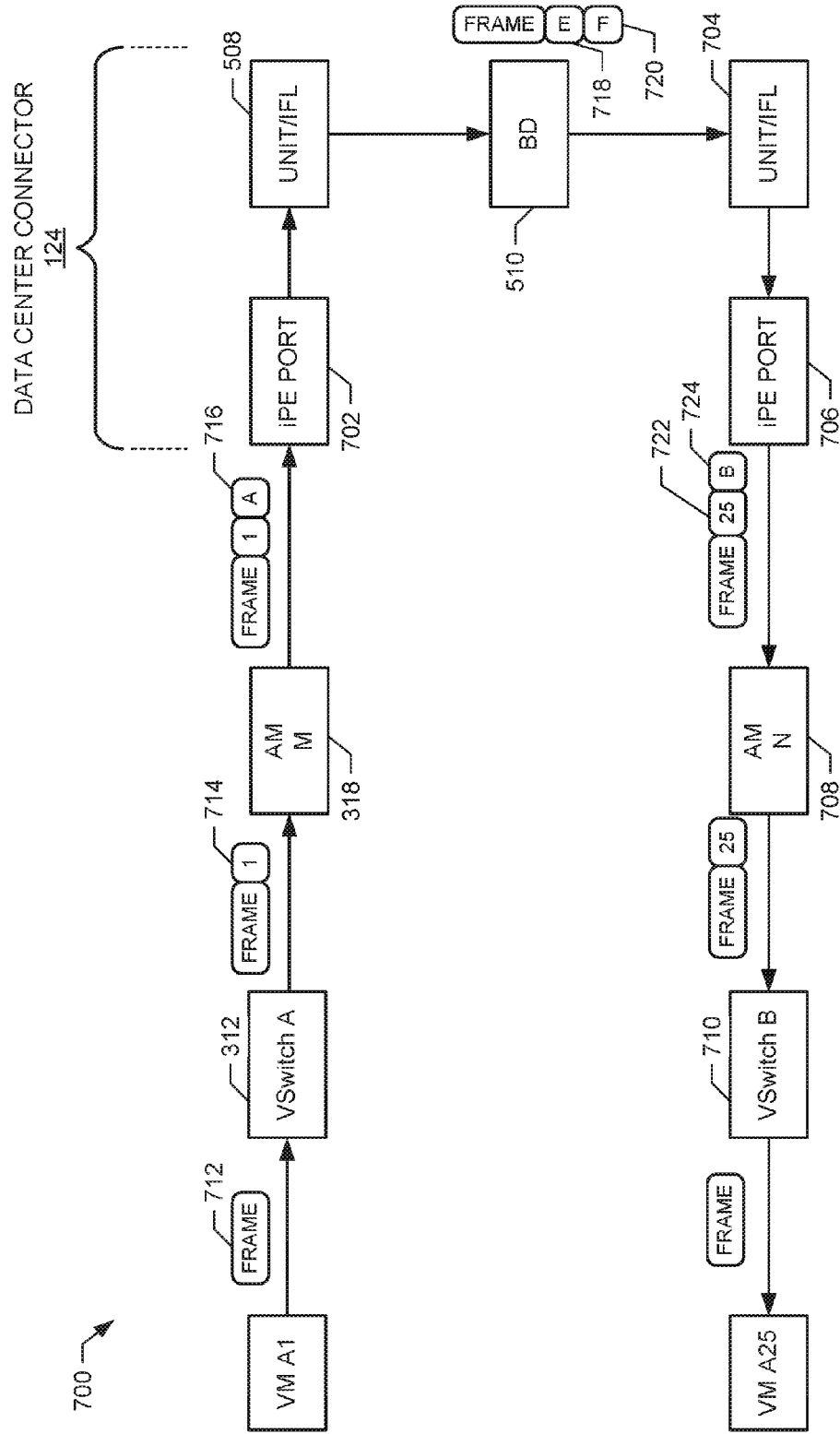
FIG. 7 shows a diagram of an example bridging domain network object communicatively coupling a first virtual machine to a second virtual machine.

FIG. 7 shows a diagram 700 of the example bridging domain network object 510 of FIG. 5 communicatively coupling virtual machine VM A1 to virtual machine VM A25. The bridging domain network object 510 also facilitates the migration of disk and/or memory state from a relatively highly utilized virtual machine VM A1 to a relatively underutilized virtual machine VM A25. In other examples, the bridging domain network object 510 may couple together applications operating on the virtual machines VM A1 and VM A25. For example, a first application may be operated by the virtual machine VM A1, which may be provisioned to efficiently operate the first application. A second application may be operated by the virtual machine VM A25, which may be provisioned to efficiently operate the second application. The virtual machine VM A1 may transmit data generated by the first application to the second application operated by the virtual machine VM A25 for further processing.

The example bridging domain network object 510 may be included within the data center connector 124 of FIGS. 1, 2, 4, 5, and 6. The diagram 500 of the illustrated example includes the virtual machine VM A1 communicatively coupled to the VSwitch 312 of FIG. 3, which is communicatively coupled to the Access Multiplexer (AM M) 318. The Access Multiplexer 318 is coupled to the data center connector 124 via an iPE port 702 of the example iPE router 320. The example IFL 508 of FIG. 5 functions as a logical interface for the physical iPE port 702. The IFL 508 is communicatively coupled to the bridging domain network object 510.

In the example of FIG. 5, the bridging domain network object 510 is also communicatively coupled to an IFL 704. The IFL 704 may be a logical interface for another iPE port 706 of the iPE router 320. Alternatively, the IFL 704 may be a logical interface for the iPE port 706 included within another iPE router associated with the cloud computing network 104. In this example, the iPE port 706 is communicatively coupled to an Access Multiplexer (AM N) 708, which may be included within a server (e.g., the server 122) separate from the server 120. The Access Multiplexer 708 is communicatively coupled to a VSwitch 710, which is communicatively coupled to the virtual machine VM A25.

In the illustrated example, the virtual machine VM A1 transmits data (e.g., communications) via a frame 712. The frame 712 may include any packet-based data. The VSwitch 312 affixes (e.g., pushes) a tag 714 (e.g., a VLAN tag) to the frame 712 when the frame 712 propagates through the VSwitch 312. The tag 714 indicates that the frame 712 originated from the virtual machine VM A1 and may be used by the data center connector 124 for routing the frame 712 within a Layer-2 VLAN (e.g., the Layer-2 VLAN 424 of FIG. 6). The VSwitch 312 determines the frame 712 originated in the virtual machine VM A1 based on an interface of the VSwitch 312 that received the frame 712. The example Access Multiplexer 318 affixes a tag 716 to the frame 712 when the frame 712 passes through the Access Multiplexer 318. The example tag 716 indicates that the frame 712 is associated with the blade server 302, which includes the VSwitch 312.

The iPE port 702 receives the frame 712 and determines the IFL 508 that corresponds to the tags 714 and 716. For example, the iPE port 702 may reference a routing and forwarding table that specifies that frames with the tags 714 and 716 are to be routed to the IFL 508 within the data center connector 124. In some examples, the iPE port 702 may determine the IFL 508 based on a physical interface of the iPE port 702 that received the frame 712. The IFL 508 receives the frame 712 and determines that the frame 712 from the virtual machine VM A1 is to be statically forwarded to the bridging domain network object 510.

The example bridging domain network object 510 receives the frame 712 and replaces the tags 714 and 716 with respective normalized tags 718 and 720. The normalized tags 718 and 720 may be configured for routing within the bridging domain network object 510. To route the frame 712, the bridging domain network object 510 accesses a forwarding table to match a destination address included within the frame 712 to a logical route. In some examples, the destination address may be a MAC address and/or an IP address. In this example, because the virtual machine VM A1 is transmitting data to the virtual machine VM A25, the destination address of the frame 712 includes a MAC address of a blade server hosting the virtual machine VM A25. The bridging domain network object 510 identifies a route to the virtual machine VM A25 and forwards the frame 712 to the IFL 704 along the determined route. In examples where the frame 712 includes a MAC address associated with the client 108, the bridging domain network object 510 forwards the frame 712 to, for example, the WAN connector 126 via the IRB network object 512 of FIG. 5.

In the example of FIG. 7, the IFL 704 receives the frame 712 and statically forwards the frame 712 to the corresponding physical iPE port 706. The example iPE port 706 swaps the tags 718 and 720 with respective tags 722 and 724 corresponding to the route to the virtual machine VM A25. The iPE port 706 transmits the frame 712 to the Access Multiplexer 708, which determines that the tag 724 corresponds to the VSwitch 710. The Access Multiplexer 708 then removes the tag 724 and transmits the frame 712 to the VSwitch 710. The example VSwitch 710 determines that the tag 722 corresponds to a blade server hosting the virtual machine VM A25. The VSwitch 710 removes the tag 722 and transmits the frame 712 to the virtual machine VM A25. In other examples, the bridging domain network object 510 may transmit a frame from the virtual machine VM A1 to the virtual appliances 222 of FIG. 2 including, for example, the load balancers 322 and 324 and/or the disk platform 330 of FIG. 3. In this manner, the bridging domain network object 510 manages the routing of data to and/or from virtual machines communicatively coupled to the data center connector 124.

FIGS. 8A-8C and 9A-9B depict example flow diagrams representative of processes that may be implemented using, for example, computer readable instructions that may be used to provision cloud computing network elements. The example processes of FIGS. 8A-8C and 9A-9B may be performed using a processor, a controller and/or any other suitable processing device. For example, the example processes of FIGS. 8A-8C and/or 9A-9B may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 8A-8C and/or 9A-9B may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 8A:
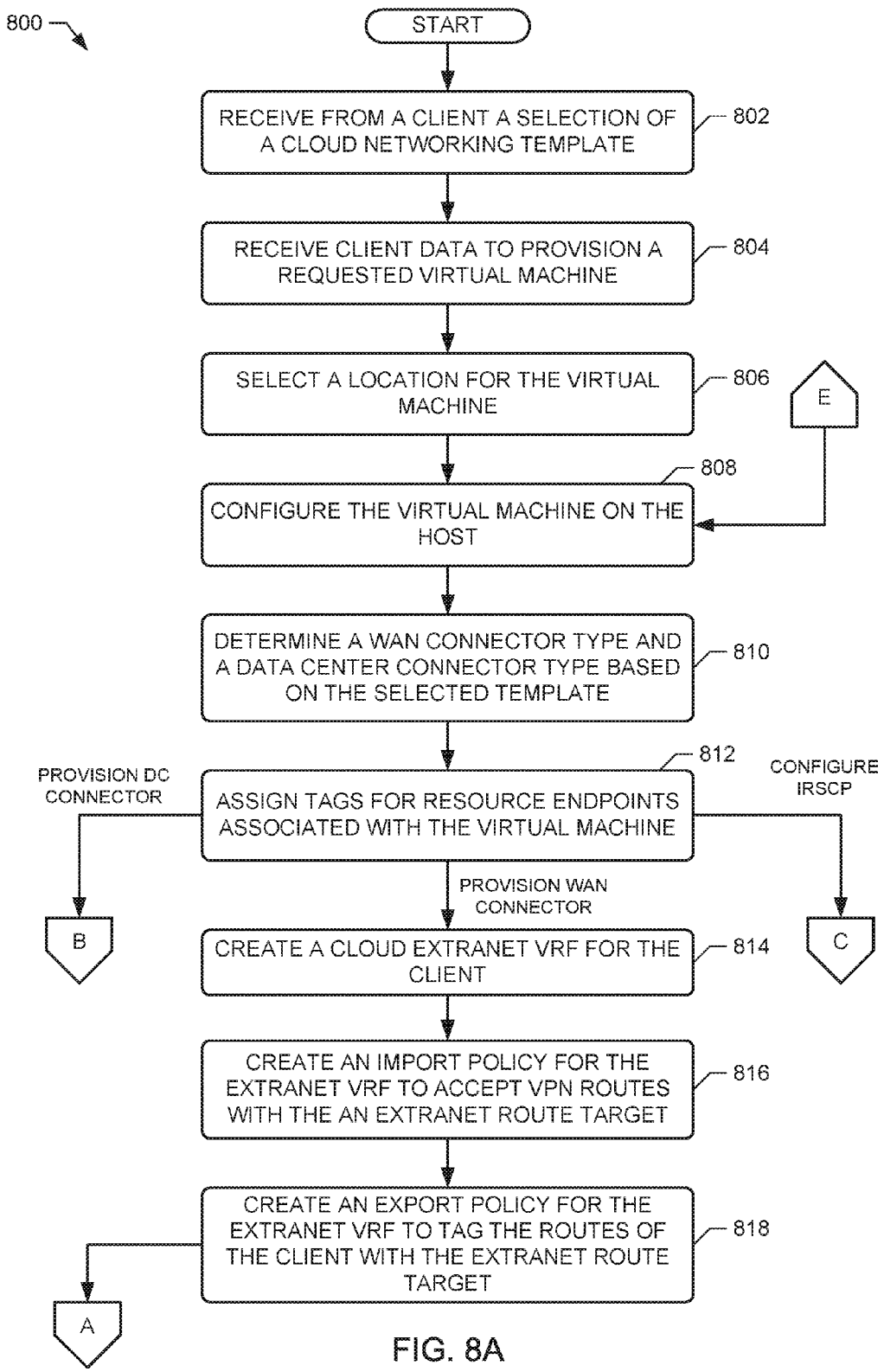
FIGS. 8A-8C and 9A-9B are flowcharts representative of example machine-accessible instructions, which may be executed to implement the cloud computing network manager of FIG. 1.
Figure 8B:
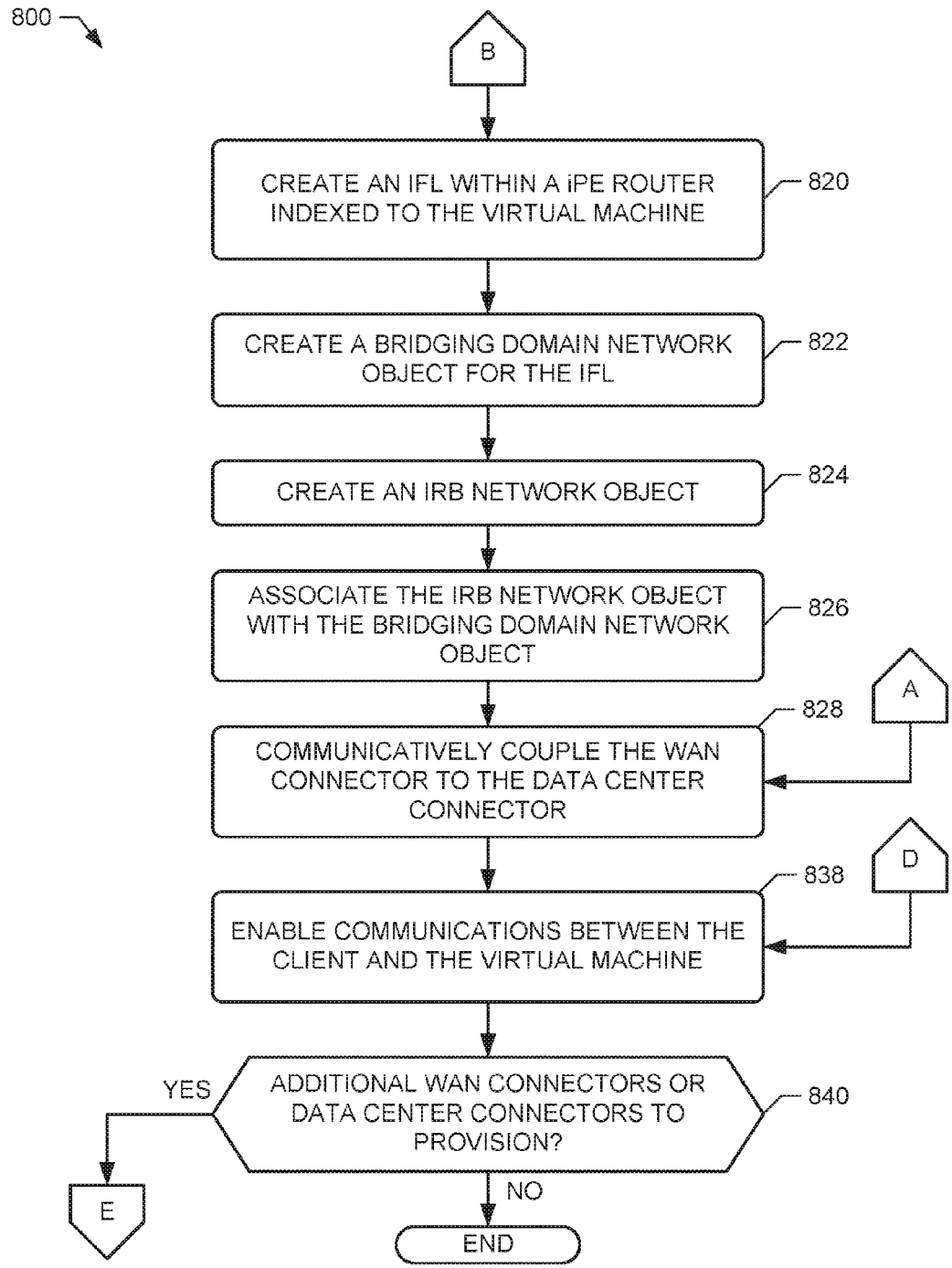
Figure 8C:
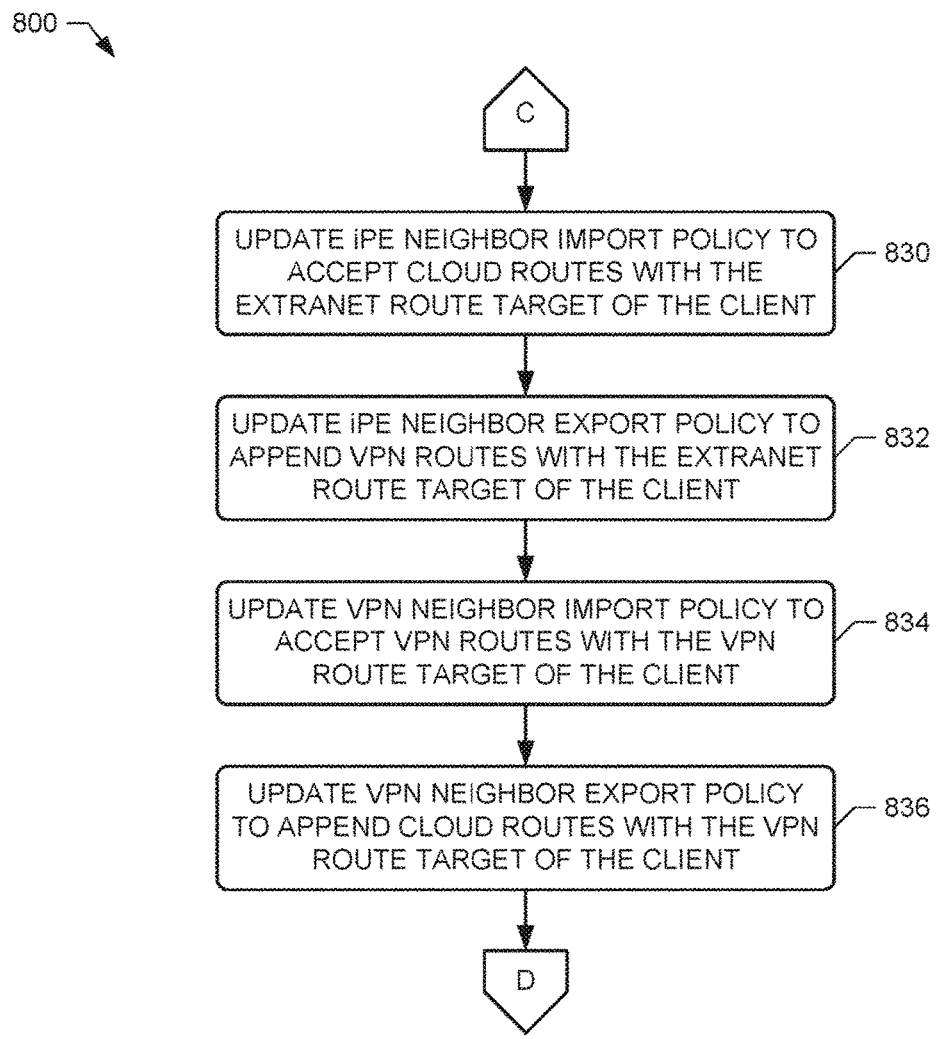

Alternatively, some or all of the example processes of FIGS. 8A-8C and/or 9A-9B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 8A-8C and/or 9A-9B may be implemented manually or as any combination(s) of any of the foregoing techniques, for example, any combination of firmware, software, discrete logic and/or hardware. Further, although the example processes of FIGS. 8A-8C and/or 9A-9B are described with reference to the flow diagrams of FIGS. 8A-8C and/or 9A-9B, other methods of implementing the processes of FIGS. 8A-8C and/or 9A-9B may be employed. For example, the order of execution of the blocks may be changed, and/or some of the blocks described may be changed, eliminated, sub-divided, or combined. Additionally, any or all of the example processes of FIGS. 8A-8C and/or 9A-9B may be performed sequentially and/or in parallel by, for example, separate processing threads, processors, devices, discrete logic, circuits, etc.

The example process 800 of FIGS. 8A-8C provisions the data center connector 124 and the WAN connector 126 based on a selection of a cloud networking template by, for example, the client administrator 138 of FIG. 1. The example process 800 begins by receiving from the client administrator 138 a selection of a cloud networking template (e.g., via the service orchestrator server 130) (block 802). The example process 800 then receives client data and/or information needed to provision a virtual machine (e.g., via the service orchestrator server 130) (block 804). Based on the information associated with the client 108, the example process 800 selects a physical location and a blade server to host the virtual machine (e.g., via the compute orchestrator server 132) (block 806). The example process 800 then configures the virtual machine on the selected host (e.g., the server 120 of FIGS. 1 and 3) (e.g., via the compute orchestrator server 132) (block 808).

The example process 800 of FIG. 8A continues by determining the WAN (e.g., an Internet) connector 126 and/or the data center connector 124 based on types of connectors within the selected cloud networking template (e.g., via the network orchestrator server 134) (block 810). The example process 800 then assigns tags (e.g., VLAN tags described in conjunction with FIG. 7) and/or identifiers for resource endpoints of the provisioned virtual machine to the determined connectors 124 and 126 (e.g., via the servers 132 and 134) (block 812).

In the illustrated example of FIGS. 8A-8C, the example process 800 provisions the Type 2 data center connector 124 and the Type 2 WAN connector 126. In other examples, the process 800 may provision other types of the connectors 124 and 126. To provision the Type 2 WAN connector 126, the example process 800 creates a cloud Extranet VRF (e.g., the VRF interface 410 and the Layer-3 MPLS-VPN 408 of FIG. 4) associated with the client 108 (e.g., via the network orchestrator server 134) (block 814). The example process 800 then creates an import policy for the Extranet VRF to accept routes associated with a VPN (e.g., the VPN 412) of the client 108 that include a route target associated the Extranet (e.g., via the IRSCP server 136) (block 816). The example process 800 next creates an export policy for the Extranet VRF to tag cloud routes with the Extranet route target that are associated with the client 108 (e.g., via the IRSCP server 136) (block 818).

To provision the Type 2 data center connector 124, the example process 800 of FIG. 8B creates an IFL (e.g., the IFL 506 of FIG. 5) on a Layer-2 802.1Q port (e.g., a physical interface) of the iPE router 320 of FIG. 3 that references VLAN tags associated with the virtual machine (e.g., via the network orchestrator server 134) (block 820). The example process 800 then creates, for example, the bridging domain network object 510 for the IFL associated with the client 108 (e.g., via the network orchestrator server 134) (block 822). In this example, the example process 800 may also assign to the bridging domain network object 510 normalized tags that correspond to the VLAN tags. The example process 800 next creates the IRB network object 512 (e.g., a logical Layer-3 interface) and associates the IRB network object 512 with the bridging domain network object 512 (e.g., via the network orchestrator server 134) (blocks 824 and 826). After provisioning the WAN connector 126 (e.g., via blocks 814-818) and the data center connector 124 (e.g., via blocks 820-826), the example process 800 of FIG. 8B communicatively couples together the connectors 124 and 126 (e.g., via the network orchestrator server 134) (block 828).

The example process 800 of FIG. 8C continues by communicatively coupling the WAN connector 126 to the client 108. To communicatively couple the WAN connector 126 to the client 108, the example process 800 updates an iPE neighbor import policy (e.g., the import policy 522 of FIG. 5) to accept cloud routes (e.g., routes from the cloud computing network 104) with the Extranet route target of the client 108 (e.g., via the IRSCP server 136) (block 830). The example process 800 then updates an iPE neighbor export policy (e.g., the export policy 524) to append VPN routes from the client 108 with the Extranet route target (e.g., via the IRSCP server 136) (block 832). The example process 800 next updates a VPN neighbor import policy (e.g., the import policy 528) to accept VPN routes from the client 108 with a VPN route target (e.g., via the IRSCP server 136) (block 834). The example process 800 next updates a VPN neighbor export policy (e.g., the export policy 526) to append cloud routes with the VPN route target associated with the client 108 (e.g., via the IRSCP server 136) (block 836).

After communicatively coupling the WAN connector 126 to the client 108, the example process 800 of FIG. 8B enables communication between the client 108 and the provisioned virtual machine (e.g., via the servers 130-136) (block 838). The example process 800 may then determine if there are any additional connectors 124 and/or 126 to provision (e.g., via the servers 130 and 134) (block 840). If there are additional connections 124 and/or 126 to provision, the example process 800 returns to block 808 and provisions a virtual machine associated with the connectors 124 and 126. If there are no additional connectors 124 and/or 126 to provision, the example process 800 terminates.

Figure 9A:
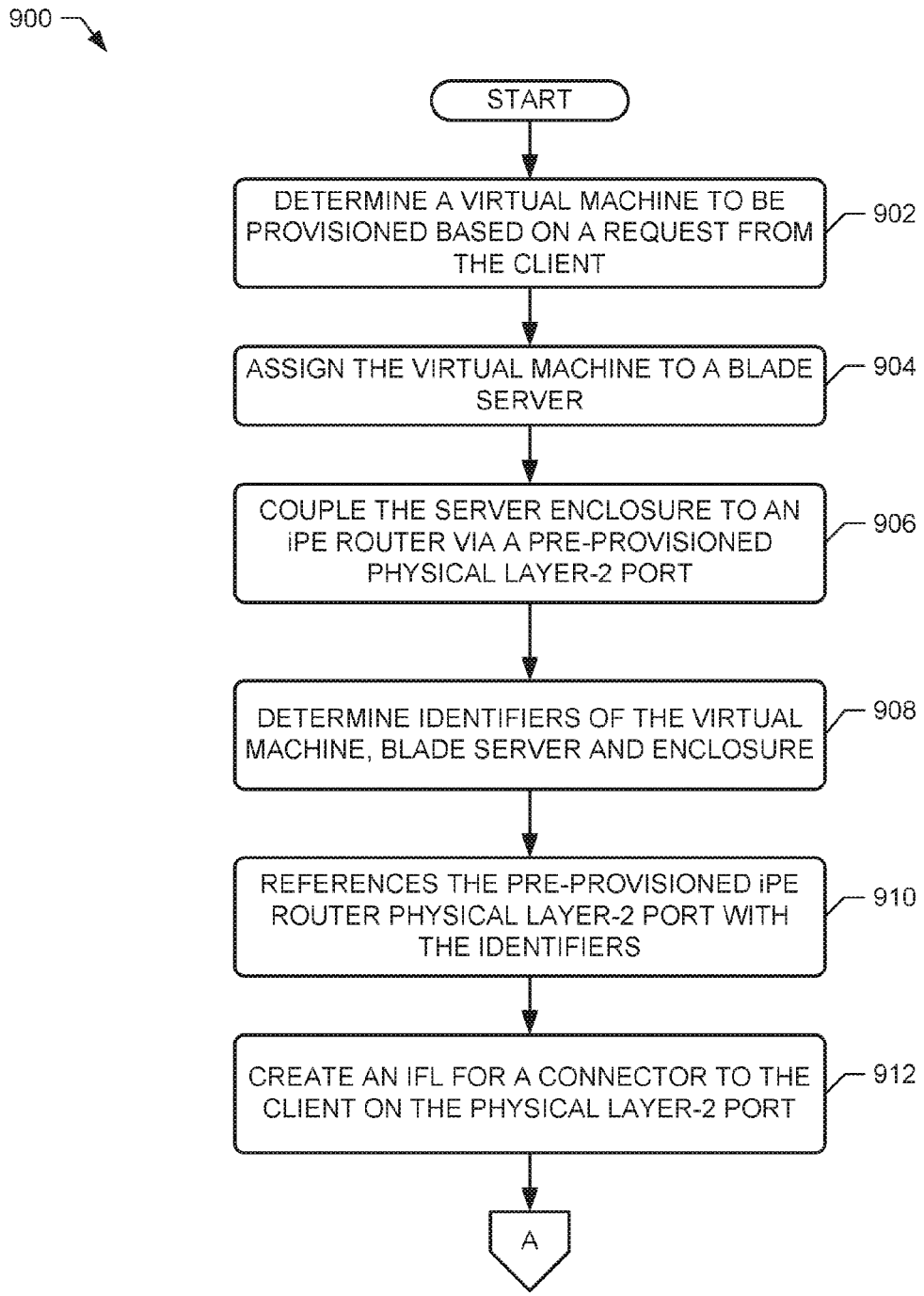
Figure 9B:
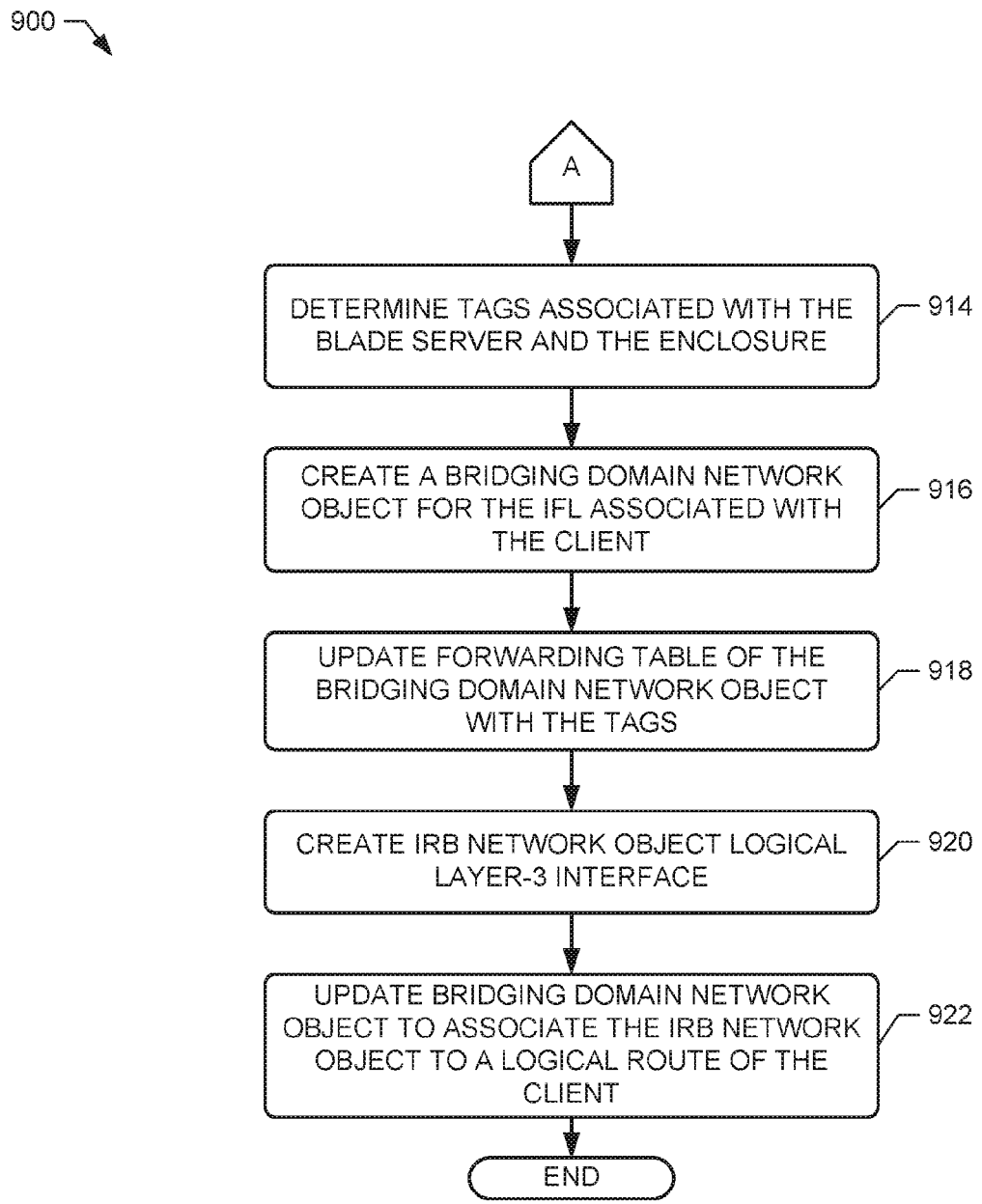

The example process 900 of FIGS. 9A-9B provisions a bridging domain network object (e.g., the bridging domain network object 510 of FIG. 5) in response to, for example, the client 108 selecting the connectors 124 and 128 via a cloud networking template. The example process 900 of FIG. 9A begins by determining a virtual machine to be provisioned based on a request from the client 108 (e.g., via the compute orchestrator server 132) (block 902). The example process 900 then assigns the virtual machine to a blade server (e.g., via the compute orchestrator server 132) (block 904). The example process 900 couples an enclosure of the blade server to the data center connector 124 via a pre-provisioned physical Layer-2 port of an iPE router (e.g., via the servers 132 and 134) (block 906).

The process 900 of the illustrated example continues by determining identifiers of the virtual machine, the blade server, the enclosure, and/or a corresponding VSwitch and Access Multiplexer (e.g., via the compute orchestrator server 132) (block 908). The example process 900 then references the pre-provisioned iPE router physical Layer-2 port to the determined identifiers (e.g., via the network orchestrator server 134) (block 910). The example process may reference the identifiers to the port by adding the identifiers to a routing and/or forwarding table accessible by a bridging domain network object. The example process 900 next creates an IFL for a connector associated with the client 108 on the physical Layer-2 port (e.g., via the network orchestrator server 134) (block 912).

The example process 900 of FIG. 9B continues by determining tags (e.g., VLAN tags) associated with the blade server and the enclosure (e.g., via the network orchestrator server 134) (block 914). The example process 900 may determine VLAN tags when the data center connector 126 includes a Layer-2 VLAN and/or a routed subnet. In other examples that utilize different routing protocols, the example process 900 may use tags and/or identifiers associated with those routing protocols.

The example process 900 next creates a bridging domain network object within the data center connector 124 for the IFL associated with the client 108 (e.g., via the network orchestrator server 134) (block 916). The example process 900 then updates a routing and/or forwarding table of the bridging domain network object with the tags (e.g., via the network orchestrator server 134) (block 918). The example process 900 may also normalize the tags for a routing protocol of the bridging domain network object. The example process 900 further creates an IRB network object (e.g., via the network orchestrator server 134) (block 920). The IRB network object may include a logical Layer-3 interface. The example process 900 also updates the bridging domain network object to associate the IRB network object with a logical route associated with the client 108 (e.g., via the network orchestrator server 134) (block 922).

After provisioning the bridging domain network object within the data center connector 124, the example process 900 terminates.

Figure 10:
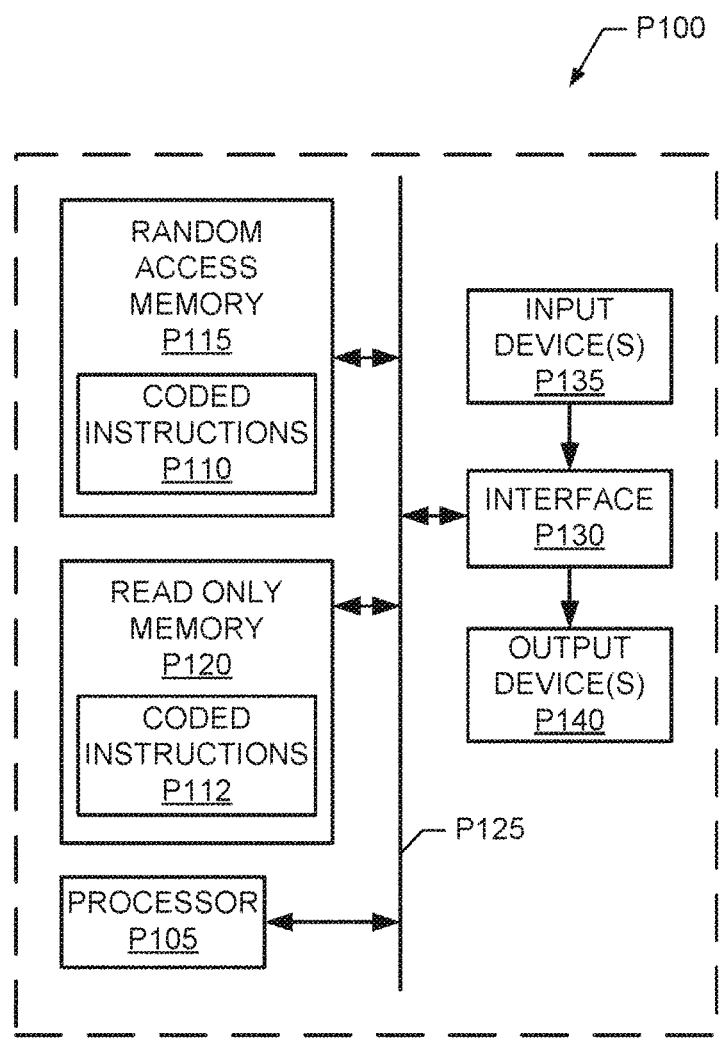
FIG. 10 is a schematic illustration of an example processor platform that may be used and/or programmed to execute the example processes and/or the example machine-accessible instructions of FIGS. 8A-8C and 9A-9B to implement any or all of the example methods, apparatus and/or articles of manufacture described herein.

FIG. 10 is a schematic diagram of an example processor platform P100 that may be used and/or programmed to implement the example servers 120 and 122, the example data center connector 124, the example WAN connector 126, the example service orchestrator server 130, example the compute orchestrator server 132, the example network orchestrator server 134, the example IRSCP server 136, the example template database 140, the example resource database 142, the example network resource database 144, the example client information database 146, and/or more generally, the example cloud computing network manager 102 of FIGS. 1-7. For example, the processor platform P100 can be implemented by one or more general-purpose processors, processor cores, microcontrollers, etc.

The processor platform P100 of the example of FIG. 10 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 8A-8C and/or 9A-9B to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example databases 140-146 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A manager comprising:
a processor; and
memory that stores instructions that, when executed by the processor, cause the processor to perform operations comprising
receiving a request to connect a private network to a cloud computing network, wherein the cloud computing network provides the private network with virtual cloud resources,
receiving configuration details for configuring a secure connection between the private network and the cloud computing network, and
creating the secure connection between the private network and the cloud computing network according to the configuration details, wherein creating the secure connection comprises provisioning network elements and coupling the private network and the cloud computing network to the network elements, and wherein the network elements comprise a wide area network connector that is compatible with the private network based, at least in part, upon a type of the private network and a data center connection that is compatible with the virtual cloud resources provided by the cloud computing network.

2. The manager of claim 1, wherein receiving the request comprises receiving the request through an interface.

3. The manager of claim 1, wherein the configuration details comprise at least one of location information, a client identification number, contact information, a number of virtual cloud resources, a type of virtual cloud resources, activation/change/deactivation sequence management, information associated with the private network, or information associated with a client.

4. The manager of claim 1, wherein creating the secure connection comprises provisioning a virtual route between the private network and the cloud computing network.

5. The manager of claim 4, wherein provisioning the virtual route comprises provisioning the virtual route between the private network, which comprises a multiprotocol label switching virtual private network, and the cloud computing network.

6. The manager of claim 1, wherein creating the secure connection comprises provisioning a plurality of virtual routes between the private network and the cloud computing network.

7. The manager of claim 6, wherein provisioning the plurality of virtual routes comprises provisioning the plurality of virtual routes in accordance with a policy.

8. The manager of claim 1, wherein creating the secure connection comprises creating the secure connection to the cloud computing network that provides a software-as-a-service web-based front-end application for the private network.

9. The manager of claim 1, wherein creating the secure connection comprises creating the secure connection to the cloud computing network that provides an infrastructure-as-a-service data processing application for the private network.

10. The manager of claim 1, wherein creating the secure connection comprises creating the secure connection to the cloud computing network that provides a computing-as-a-service application to the private network.

11. The manager of claim 1, wherein creating the secure connection comprises creating the secure connection to the cloud computing network that provides storage-as-as-service database management application to the private network.

12. The manager of claim 1, wherein creating the secure connection comprises coupling a device within the private network to the cloud computing network.

13. The manager of claim 1, wherein creating the secure connection comprises dynamically adjusting network resources based on a traffic load from the private network.

14. The manager of claim 1, wherein creating the secure connection comprises instantiating network elements that provide the secure connection.

15. The manager of claim 1, wherein creating the secure connection comprises coupling modular sets of network elements and associated logical configurations.

16. The manager of claim 15, wherein coupling the modular sets of network elements and the associated logical configurations comprises using combinatorial usage logic derived from a template selected by a user.

17. The manager of claim 1, wherein receiving the request comprises receiving identification of a desired wide area network connector for the private network from among a plurality of multiple wide area network connectors.

18. The manager of claim 1, wherein receiving the request comprises receiving identification of a desired data center connector for the cloud computing network from among a plurality of data center connectors.

19. The manager of claim 1, wherein the operations further comprise provisioning additional network resources to dynamically move traffic load from a first virtual cloud resource to a second virtual cloud resource that has spare capacity.

20. The manager of claim 1, wherein the operations further comprise providing a user with a template for receiving the configuration details.

21. The manager of claim 1, wherein the operations further comprise providing a user with a plurality of cloud networking templates and receiving selection of a desired cloud networking template.

22. The manager of claim 1, wherein creating the secure connection comprises creating the secure connection to the private network which comprises a local area network.

23. The manager of claim 1, wherein creating the secure connection comprises creating the secure connection to the private network which comprises a plurality of private local area networks.

24. The manager of claim 1, wherein the creating the secure connection comprises creating a route policy for a route between the private network and the cloud computing network.

25. The manager of claim 24, wherein creating the route policy comprises creating an import policy for the route.

26. The manager of claim 24, wherein creating the route policy comprises creating an export policy for the route.

27. The manager of claim 1, wherein creating the secure connection comprises using virtualized network resources for the secure connection.

* * * * *